(12) United States Patent
Brenize et al.

(10) Patent No.: US 12,145,864 B2
(45) Date of Patent: *Nov. 19, 2024

(54) METHOD AND SYSTEM FOR REMOVING HYDROGEN SULFIDE FROM SOUR OIL AND SOUR WATER

(71) Applicant: Anschutz Exploration Corporation, Denver, CO (US)

(72) Inventors: Galen Brenize, Parker, CO (US); Jeffrey Blair Morris, Evanston, WY (US)

(73) Assignee: Anschutz Exploration Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,977

(22) Filed: Sep. 19, 2023

(65) Prior Publication Data

US 2024/0010523 A1 Jan. 11, 2024

Related U.S. Application Data

(63) Continuation of application No. 17/902,065, filed on Sep. 2, 2022, now Pat. No. 11,767,236, which is a (Continued)

(51) Int. Cl.
*C02F 1/20* (2023.01)
*B01D 19/00* (2006.01)
(Continued)

(52) U.S. Cl.
CPC ............ *C02F 1/20* (2013.01); *B01D 19/0005* (2013.01); *B01D 19/0063* (2013.01);
(Continued)

(58) Field of Classification Search
None
See application file for complete search history.

(56) References Cited

U.S. PATENT DOCUMENTS 3,255,571 A 6/1966 Walker et al.
3,387,431 A 6/1968 Siebert
(Continued)

FOREIGN PATENT DOCUMENTS

CN 101532380 9/2009
EP 2495219 9/2012
(Continued)

OTHER PUBLICATIONS

"30 CFDR 250," Code of Federal Regulations, 2012, retrieved from http://www.gpo.gov/fdsys/pkg/CFR-2011-title30-vol2-part250-subpartK.pdf, retrieved on Jul. 1, 2015, pp. 213-221.
(Continued)

*Primary Examiner* — Clare M Perrin
(74) *Attorney, Agent, or Firm* — Sheridan Ross P.C.

(57) ABSTRACT

Embodiments of the present invention are generally related to a system and method to remove hydrogen sulfide from sour water and sour oil. Particularly, hydrogen sulfide is removed from sour water and sour oil without the need for special chemicals, such as catalyst chemicals, scavenger chemicals, hydrocarbon sources, or a large-scale facility. The system and method in the present invention is particularly useful in exploratory oil and gas fields, where large facilities to remove hydrogen sulfide may be inaccessible. The present invention addresses the need for safe and cost-effective transport of the deadly neurotoxin. Particular embodiments involve a system and method that can be executed both on a small and large scale to sweeten sour water and sour oil.

9 Claims, 8 Drawing Sheets

Related U.S. Application Data continuation of application No. 17/141,214, filed on Jan. 4, 2021, now Pat. No. 11,440,815, which is a continuation-in-part of application No. 15/945,277, filed on Apr. 4, 2018, now Pat. No. 10,882,762, which is a continuation of application No. 15/646,153, filed on Jul. 11, 2017, now Pat. No. 9,938,163, which is a continuation of application No. 15/180,426, filed on Jun. 13, 2016, now Pat. No. 9,708,196, which is a continuation-in-part of application No. 14/709,286, filed on May 11, 2015, now Pat. No. 9,364,773, which is a continuation-in-part of application No. 14/185,006, filed on Feb. 20, 2014, now Pat. No. 9,028,679.

(60) Provisional application No. 61/768,029, filed on Feb. 22, 2013.

(51) Int. Cl.
| | |
|---|---|
| *B03C 5/02* | (2006.01) |
| *C02F 1/58* | (2023.01) |
| *C10G 21/16* | (2006.01) |
| *C10G 21/30* | (2006.01) |
| *C10G 31/08* | (2006.01) |
| *C02F 1/66* | (2023.01) |
| *C02F 101/10* | (2006.01) |
| *C02F 101/32* | (2006.01) |

(52) U.S. Cl.
CPC ..... *B01D 19/0068* (2013.01); *B01D 19/0073* (2013.01); *B03C 5/02* (2013.01); *C02F 1/58* (2013.01); *C10G 21/16* (2013.01); *C10G 21/30* (2013.01); *C10G 31/08* (2013.01); *C02F 1/66* (2013.01); *C02F 2101/101* (2013.01); *C02F 2101/325* (2013.01); *C02F 2209/005* (2013.01); *C02F 2209/265* (2013.01); *C02F 2303/02* (2013.01); *C10G 2300/207* (2013.01); *C10G 2300/4068* (2013.01)

(56) References Cited

U.S. PATENT DOCUMENTS

| | | |
|---|---|---|
| 3,547,190 A | 12/1970 | Wilkerson |
| 3,583,901 A | 6/1971 | Piehl |
| 3,618,667 A | 11/1971 | Snavely, Jr. |
| 3,844,942 A | 10/1974 | Barber |
| 3,913,673 A | 10/1975 | Barber |
| 3,969,106 A | 7/1976 | Wark |
| 3,977,972 A | 8/1976 | Bloch et al. |
| 3,984,316 A | 10/1976 | Worrall et al. |
| 3,997,437 A | 12/1976 | Prince et al. |
| 4,011,304 A | 3/1977 | Mancini et al. |
| 4,013,779 A | 3/1977 | Haese |
| 4,036,942 A | 7/1977 | Sibeud et al. |
| 4,051,016 A | 9/1977 | Metrailer et al. |
| 4,076,621 A | 2/1978 | Hardison |
| 4,102,989 A | 7/1978 | Wheelock |
| 4,208,384 A | 6/1980 | Mitchell |
| 4,218,309 A | 8/1980 | Compton |
| 4,253,928 A | 3/1981 | Blytas et al. |
| 4,324,776 A | 4/1982 | Kim |
| 4,370,236 A | 1/1983 | Ferguson |
| 4,384,956 A | 5/1983 | Mulder |
| 4,402,713 A | 9/1983 | Domahidy |
| 4,410,432 A | 10/1983 | Domahidy |
| 4,412,924 A | 11/1983 | Feather |
| 4,414,103 A | 11/1983 | Farrell |
| 4,414,817 A | 11/1983 | Jernigan |
| 4,444,259 A | 4/1984 | Schwall |
| 4,447,330 A | 5/1984 | Babineaux, III |
| 4,452,699 A | 6/1984 | Suzuki et al. |
| 4,468,929 A | 9/1984 | Jernigan |
| 4,473,541 A | 9/1984 | Palm |
| 4,528,817 A | 7/1985 | Jernigan |
| 4,536,293 A | 8/1985 | Babineaux, III |
| 4,537,605 A | 8/1985 | Gouw |
| 4,565,620 A | 1/1986 | Montgomery et al. |
| 4,784,746 A | 11/1988 | Farcasiu et al. |
| 4,784,775 A | 11/1988 | Hardison |
| 4,816,158 A | 3/1989 | Shimura et al. |
| 4,874,589 A | 10/1989 | Gorlich |
| 4,925,569 A | 5/1990 | Chou et al. |
| 4,976,935 A | 12/1990 | Lynn |
| 4,992,078 A | 2/1991 | Meszaros |
| 4,992,181 A | 2/1991 | Siebert |
| 5,006,240 A | 4/1991 | Steffero, Sr. |
| 5,015,370 A | 5/1991 | Fricano |
| 5,057,292 A | 10/1991 | Monticelli, Jr. |
| 5,071,574 A | 12/1991 | Pou |
| 5,073,310 A | 12/1991 | Ramsey |
| 5,089,246 A | 2/1992 | Schatz |
| 5,096,580 A | 3/1992 | Auchincloss |
| 5,135,616 A | 8/1992 | Nicholson et al. |
| 5,141,647 A | 8/1992 | Bhadra |
| 5,286,389 A | 2/1994 | Hardison |
| 5,296,205 A | 3/1994 | Hardison |
| 5,340,484 A | 8/1994 | Prince et al. |
| 5,348,573 A | 9/1994 | Tomassian et al. |
| 5,350,516 A | 9/1994 | Bhadra |
| 5,362,181 A | 11/1994 | DenBesten |
| 5,405,531 A | 4/1995 | Hitzman et al. |
| 5,601,700 A | 2/1997 | Bridge et al. |
| 5,730,784 A | 3/1998 | Smith et al. |
| 5,744,040 A | 4/1998 | Slates et al. |
| 5,750,392 A | 5/1998 | Hitzman et al. |
| 5,788,843 A | 8/1998 | Larrabee, Jr. et al. |
| 5,858,206 A | 1/1999 | Castillo |
| 6,074,562 A | 6/2000 | Falkner |
| 6,103,108 A | 8/2000 | Kohlenberg |
| 6,153,108 A | 11/2000 | Klock et al. |
| 6,174,108 B1 | 1/2001 | Suthersan |
| 6,325,943 B1 | 12/2001 | Kohlenberg |
| 6,352,680 B1 | 3/2002 | Watson et al. |
| 6,444,117 B1 | 9/2002 | Khan et al. |
| 6,495,029 B1 | 12/2002 | Schorfheide et al. |
| 6,539,884 B1 | 4/2003 | Husain et al. |
| 6,596,914 B2 | 7/2003 | Gore et al. |
| 6,623,627 B1 | 9/2003 | Zhou |
| 6,673,230 B2 | 1/2004 | Hagen et al. |
| 6,692,635 B2 | 2/2004 | Didillon et al. |
| 6,736,962 B1 | 5/2004 | Cook et al. |
| 6,773,582 B2 | 8/2004 | Anthony |
| 6,773,595 B2 | 8/2004 | Gantzer |
| 6,780,392 B2 | 8/2004 | Gross et al. |
| 6,808,639 B2 | 10/2004 | Rawson et al. |
| 6,827,845 B2 | 12/2004 | Gong et al. |
| 6,881,325 B2 | 4/2005 | Morris et al. |
| 6,960,291 B2 | 11/2005 | Greaney et al. |
| 6,994,491 B2 | 2/2006 | Kittle |
| 7,005,058 B1 | 2/2006 | Towler |
| 7,014,751 B2 | 3/2006 | Greaney et al. |
| 7,029,573 B2 | 4/2006 | Greaney et al. |
| 7,097,760 B1 | 8/2006 | Kalnes et al. |
| 7,100,683 B2 | 9/2006 | Heilmann et al. |
| 7,204,967 B2 | 4/2007 | Bierle et al. |
| 7,232,848 B2 | 6/2007 | Mohedas et al. |
| 7,244,352 B2 | 7/2007 | Halbert et al. |
| 7,252,756 B2 | 8/2007 | Gong et al. |
| 7,258,848 B1 | 8/2007 | Blackwell et al. |
| 7,279,104 B2 | 10/2007 | Keeton, Jr. |
| 7,282,081 B2 | 10/2007 | Verscharen |
| 7,309,416 B2 | 12/2007 | Fokema et al. |
| 7,351,330 B1 | 4/2008 | Fader et al. |
| 7,390,470 B2 | 6/2008 | Anderson et al. |
| 7,419,582 B1 | 9/2008 | Hoehn et al. |
| 7,419,586 B2 | 9/2008 | Ellis et al. |
| 7,431,822 B2 | 10/2008 | Farshid et al. |
| 7,431,823 B2 | 10/2008 | Farshid et al. |
| 7,431,827 B2 | 10/2008 | Rock et al. |
| 7,431,831 B2 | 10/2008 | Farshid et al. |
| 7,449,102 B2 | 11/2008 | Kalnes |

(56) References Cited

U.S. PATENT DOCUMENTS

| | | |
|---|---|---|
| 7,452,405 B2 | 11/2008 | Duraiswamy et al. |
| 7,470,358 B1 | 12/2008 | Kalnes |
| 7,507,325 B2 | 3/2009 | Gueret et al. |
| 7,507,328 B2 | 3/2009 | Ellis et al. |
| 7,523,724 B2 | 4/2009 | Duraiswamy et al. |
| 7,537,643 B2 | 5/2009 | Neylon et al. |
| 7,547,386 B1 | 6/2009 | Thakkar et al. |
| 7,575,732 B2 | 8/2009 | Anderson et al. |
| 7,591,940 B2 | 9/2009 | Kalnes |
| 7,650,938 B2 | 1/2010 | Hall et al. |
| 7,678,263 B2 | 3/2010 | Mock |
| 7,678,264 B2 | 3/2010 | Bhan |
| 7,695,701 B2 | 4/2010 | Tekie et al. |
| 7,744,749 B2 | 6/2010 | Martinie et al. |
| 7,790,018 B2 | 9/2010 | Khan |
| 7,794,585 B2 | 9/2010 | Leonard et al. |
| 7,799,208 B2 | 9/2010 | Kokayeff et al. |
| 7,803,267 B2 | 9/2010 | Cheste et al. |
| 7,803,979 B2 | 9/2010 | Gray et al. |
| 7,807,046 B2 | 10/2010 | Bhan et al. |
| 7,837,965 B2 | 11/2010 | Anderson |
| 7,842,180 B1 | 11/2010 | Leonard et al. |
| 7,842,181 B2 | 11/2010 | Choi |
| 7,857,964 B2 | 12/2010 | Mashiko et al. |
| 7,858,834 B2 | 12/2010 | Powers |
| 7,879,223 B2 | 2/2011 | Wellington et al. |
| 7,883,618 B2 | 2/2011 | Claude et al. |
| 7,897,133 B1 | 3/2011 | Hojjatie et al. |
| 7,918,992 B2 | 4/2011 | Bhan |
| 7,922,894 B2 | 4/2011 | Plantenga et al. |
| 7,927,480 B2 | 4/2011 | Podrebarac |
| 7,931,739 B2 | 4/2011 | LaCour et al. |
| 7,935,178 B2 | 5/2011 | Lechnick et al. |
| 7,938,955 B2 | 5/2011 | Araki et al. |
| 7,942,198 B2 | 5/2011 | Zirkle |
| 7,947,168 B2 | 5/2011 | Machin et al. |
| 7,955,401 B2 | 6/2011 | Ghonasgi et al. |
| 7,959,797 B2 | 6/2011 | Wellington et al. |
| 7,985,332 B2 | 7/2011 | Greaney et al. |
| 7,988,767 B2 | 8/2011 | Graham et al. |
| 8,002,967 B2 | 8/2011 | Hunter et al. |
| 8,008,534 B2 | 8/2011 | Petri et al. |
| 8,016,999 B2 | 9/2011 | Borgna et al. |
| 8,025,791 B2 | 9/2011 | Wellington et al. |
| 8,043,495 B2 | 10/2011 | Podrebarac |
| 8,070,936 B2 | 12/2011 | Wellington et al. |
| 8,075,762 B2 | 12/2011 | Greaney et al. |
| 8,083,813 B2 | 12/2011 | Nair et al. |
| 8,118,995 B2 | 2/2012 | King et al. |
| 8,123,932 B2 | 2/2012 | Montanari et al. |
| 8,128,805 B2 | 3/2012 | Vaarkamp |
| 8,128,811 B2 | 3/2012 | McCarthy et al. |
| 8,142,646 B2 | 3/2012 | Choi et al. |
| 8,152,994 B2 | 4/2012 | Subramanian et al. |
| 8,163,167 B2 | 4/2012 | Himelfarb |
| 8,163,179 B2 | 4/2012 | Nagamori et al. |
| 8,202,414 B2 | 6/2012 | Reesink |
| 8,216,520 B2 | 7/2012 | Choi et al. |
| 8,236,172 B2 | 8/2012 | Podrebarac et al. |
| 8,241,489 B2 | 8/2012 | Bhan et al. |
| 8,286,951 B2 | 10/2012 | Dart et al. |
| 8,288,303 B2 | 10/2012 | Higashi et al. |
| 8,303,804 B2 | 11/2012 | Helton et al. |
| 8,318,004 B2 | 11/2012 | Drnevich et al. |
| 8,318,644 B2 | 11/2012 | Kamimura et al. |
| 8,323,416 B2 | 12/2012 | Bradley et al. |
| 8,323,480 B2 | 12/2012 | Choi |
| 8,333,884 B2 | 12/2012 | Hunter et al. |
| 8,334,243 B2 | 12/2012 | Guevremont et al. |
| 8,366,913 B2 | 2/2013 | Choi et al. |
| 8,366,914 B2 | 2/2013 | Yang et al. |
| 8,371,741 B2 | 2/2013 | Hassan et al. |
| 8,394,254 B2 | 3/2013 | Wellington et al. |
| 8,394,261 B2 | 3/2013 | Litz et al. |
| 8,398,848 B2 | 3/2013 | McConnachie et al. |
| 8,403,043 B2 | 3/2013 | Khan et al. |
| 8,409,427 B2 | 4/2013 | Raybold et al. |
| 8,414,763 B2 | 4/2013 | da Silva Ferreira Alves et al. |
| 8,418,718 B2 | 4/2013 | Hebblethwaite |
| 8,424,181 B2 | 4/2013 | Lewis et al. |
| 8,431,510 B2 | 4/2013 | Gabrielov et al. |
| 8,444,945 B2 | 5/2013 | Takatsu et al. |
| 8,445,418 B2 | 5/2013 | Yamada |
| 8,450,255 B2 | 5/2013 | Ikeda et al. |
| 8,455,407 B2 | 6/2013 | Schmidt-Amelunxen et al. |
| 8,476,210 B2 | 7/2013 | Short |
| 8,486,258 B2 | 7/2013 | Podrebarac et al. |
| 8,491,784 B2 | 7/2013 | Reynolds et al. |
| 8,506,794 B2 | 8/2013 | Bhan et al. |
| 8,518,244 B2 | 8/2013 | Schorfheide et al. |
| 8,563,486 B2 | 10/2013 | Tsujimoto et al. |
| 8,568,679 B2 | 10/2013 | Ripperger |
| 8,569,216 B2 | 10/2013 | Blain et al. |
| 8,580,020 B2 | 11/2013 | Hebblethwaite |
| 8,591,726 B2 | 11/2013 | Umansky et al. |
| 8,603,953 B2 | 12/2013 | Aoki et al. |
| 8,608,938 B2 | 12/2013 | Wellington et al. |
| 8,608,942 B2 | 12/2013 | Subramanian et al. |
| 8,608,946 B2 | 12/2013 | Bhan et al. |
| 8,613,851 B2 | 12/2013 | Wellington et al. |
| 8,613,852 B2 | 12/2013 | Leta et al. |
| 8,617,383 B2 | 12/2013 | Prentice et al. |
| 8,642,517 B2 | 2/2014 | Matsui et al. |
| 8,642,521 B2 | 2/2014 | Ahlers et al. |
| 8,652,321 B2 | 2/2014 | Debuisschert et al. |
| 8,658,027 B2 | 2/2014 | Koseoglu et al. |
| 8,663,453 B2 | 3/2014 | Wellington et al. |
| 8,663,459 B2 | 3/2014 | Al-Shahrani et al. |
| 8,663,460 B2 | 3/2014 | Gallup |
| 8,673,133 B2 | 3/2014 | Yean et al. |
| 8,679,324 B2 | 3/2014 | Subramaniyam |
| 8,696,888 B2 | 4/2014 | Keusenkothen et al. |
| 8,702,853 B2 | 4/2014 | Hebblethwaite |
| 8,702,975 B2 | 4/2014 | Gallup et al. |
| 8,703,663 B2 | 4/2014 | Tagawa |
| 8,709,989 B2 | 4/2014 | Yagishita |
| 8,715,489 B2 | 5/2014 | Martinie et al. |
| 8,721,871 B1 | 5/2014 | Dindi et al. |
| 8,728,177 B2 | 5/2014 | Jackam et al. |
| 8,728,304 B2 | 5/2014 | Gallup et al. |
| 8,734,637 B2 | 5/2014 | Taylor |
| 8,734,715 B2 | 5/2014 | Miller |
| 8,741,001 B1 | 6/2014 | Schuetzle et al. |
| 8,753,504 B2 | 6/2014 | Whyatt et al. |
| 8,754,016 B2 | 6/2014 | Tagawa et al. |
| 8,764,855 B2 | 7/2014 | Leonard et al. |
| 8,815,083 B2 | 8/2014 | Watson |
| 8,821,615 B2 | 9/2014 | Weiss et al. |
| 9,005,432 B2 | 4/2015 | Choi et al. |
| 9,028,679 B2 | 5/2015 | Morris |
| 9,254,453 B2 | 2/2016 | McDaniel et al. |
| 9,255,731 B2 | 2/2016 | Prim et al. |
| 9,364,773 B2 | 6/2016 | Morris |
| 9,708,196 B2 | 7/2017 | Brenize et al. |
| 9,938,163 B2 | 4/2018 | Brenize et al. |
| 10,882,762 B2 | 1/2021 | Brenize et al. |
| 11,440,815 B2* | 9/2022 | Brenize ............ B01D 19/0073 |
| 11,767,236 B2* | 9/2023 | Brenize ............ B01D 19/0073 |
| | | 95/254 |
| 2002/0131927 A1 | 9/2002 | Anderson et al. |
| 2005/0151289 A1 | 7/2005 | Rink et al. |
| 2008/0289502 A1 | 11/2008 | Betting et al. |
| 2009/0173664 A1 | 7/2009 | Choi et al. |
| 2010/0243578 A1 | 9/2010 | Frost et al. |
| 2011/0024328 A1 | 2/2011 | Virdi et al. |
| 2011/0147266 A1 | 6/2011 | Choi |
| 2011/0272365 A1 | 11/2011 | DeFosse et al. |
| 2011/0315600 A1 | 12/2011 | Choi et al. |
| 2012/0024756 A1 | 2/2012 | Verma et al. |
| 2012/0085236 A1 | 4/2012 | McCorriston et al. |
| 2012/0085973 A1 | 4/2012 | Jungst et al. |
| 2012/0111769 A1 | 5/2012 | Hassan et al. |
| 2012/0118035 A1 | 5/2012 | Zhao et al. |
| 2012/0157975 A1 | 6/2012 | Feneley |

(56) References Cited

U.S. PATENT DOCUMENTS

| | | |
|---|---|---|
| 2012/0160502 A1 | 6/2012 | Pettigrew |
| 2012/0220500 A1 | 8/2012 | Matza et al. |
| 2012/0237430 A1 | 9/2012 | Anderson et al. |
| 2012/0273367 A1 | 11/2012 | Themy et al. |
| 2013/0056394 A1 | 3/2013 | Ancheyta et al. |
| 2013/0256191 A1 | 10/2013 | Zimmerman et al. |
| 2013/0256192 A1 | 10/2013 | Zimmerman et al. |
| 2013/0298601 A1 | 11/2013 | Prim et al. |
| 2013/0312974 A1 | 11/2013 | McClung, IV |
| 2013/0315794 A1 | 11/2013 | Schaffer et al. |
| 2013/0320258 A1 | 12/2013 | Lehrer et al. |
| 2013/0324397 A1 | 12/2013 | Wilson et al. |
| 2014/0065057 A1 | 3/2014 | Metheral et al. |
| 2014/0091009 A1 | 4/2014 | Banerjee et al. |
| 2014/0091010 A1 | 4/2014 | Banerjee et al. |
| 2014/0275693 A1 | 9/2014 | Zink |
| 2014/0353112 A1 | 12/2014 | Hassan et al. |
| 2015/0000525 A1 | 1/2015 | Pandya et al. |
| 2015/0093314 A1 | 4/2015 | Critchfield et al. |
| 2015/0122125 A1 | 5/2015 | Critchfield et al. |
| 2015/0217261 A1 | 8/2015 | Norling |
| 2015/0360164 A1 | 12/2015 | Carruthers et al. |
| 2016/0010002 A1 | 1/2016 | Norling |

FOREIGN PATENT DOCUMENTS

| | | |
|---|---|---|
| JP | 2008-055291 | 3/2008 |
| JP | 2008-307475 | 12/2008 |
| WO | WO 2005/066304 | 7/2005 |
| WO | WO 2005/066305 | 7/2005 |

OTHER PUBLICATIONS

"ABB Analytical—pH/ORP Sour Water Strip Tower," ABB, 2010, 2 pages.
"AMGAS Services Inc Launches New Sour Oil Recovery Process in the Middle East as a Safe, Cost-Effective Alternative to Crude Oil Flaring," Press Release, AMGAS, Mar. 24, 2013, retrieved from http://www.am-gas.com/edia-and-news/69-press-release-amgas-servies-inc-launches-ne . . . , 2 pages.
"Cargo Additive Treatment Services," Intertek, undated, retrieved from www.intertek.com/petroleum/inspection/cargo-additive-treatment/Cargo Additive Treatment Brochure.pdf, 4 pages.
"Caught in the Act," Press Release, AMGAS Services Inc., Feb. 2014, retrieved from http://amgas-h2s.tumblr.com/post/77810722938/press-release-caught-in-the-act, 1 page.
"ChemInfo: Hydrogen sulfide," Canadian Centre for Occupational Health & Safety, 2005, retrieved from http://www.ccohs.ca/products/databases/samples/CHEMINFO.html, retrieved on Jul. 1, 2015, pp. 1-32.
"Fundamentals of Sour Water Stripping," KPS Technology & Engineering, Presented at the Brimstone Sulfer Symposia, 2008, 41 pages.
"Hydrogen Sulfide & Sour Crude Oil: "Hazard to Life—A Potential Killer"," Michigan Department of Licensing and Regulatory Affairs, 2004, 3 pages.
"Hydrogen Sulfide (H2S)," Technical Notes #022, AmSpec LLC, undated, 3 pages.
"Partitioning of Hydrogen Sulphide in Wellstream Fluids," CAPCIS, 2010, pp. 1-10.
"Sour Water Stripper: Application Data Sheet ADS 2900-10/rev.C," Rosemount Analytical Inc, 2008, 2 pages.
"Sulfuro de Hidrógeno," (no English translation available), EcuRed: Encliclopedia cubana, Nov. 1, 2011 [retrieved on Apr. 11, 2014], retrieved from: www.ecured.cu/index.php?title=Sulfuro_de_Hidr%C3%B3geno&oldid=1103062, 6 pages.
Armstrong et al., "Sour Water Stripping," Today's Refinery, Jun. 1996, 5 pages.
Chastain, Jr., "Hydrogen Sulfide in Water Systems: What's that Smell?," Consultant's Update, Chastain-Skillman, Inc., 2008, 3 pages.

Ellerd, "Sour rejections," Petroleum News, May 26, 2013, retrieved from www.petroleumnewsbakken.com/pntruncate/356656504.shtml, 10 pages.
Feinman, "Enbridge Pipelines ND Files FERC Specification on Hydrogen Sulfide," The oilSpot News, Schneider Electric, May 17, 2013, retrieved from • http://oilspot2.dtnenergy.com/e_article002702389.cfm?x=b11,0, 1 page.
Prezioso, "Enbridge may shut Bakken oil rail terminal in sulfide gas dispute," May 15, 2013, retrieved from • http://www.reuters.com/article/2013/05/15/us-enbridge-berthold-idUSBRE94E13U20130515, 4 pages.
Skrtic, "Hydrogen Sulfide, Oil and Gas, and People's Health," submitted for fulfillment of Masters Degree, University of California, Berkeley, May 2006, 79 pages.
Weiland et al., "Sour Water Strippers Exposed," Laurence Reid Gas Conditioning Conference, 2012, 15 pages.
Official Action for Canadian Patent Application No. 2,843,041, dated Jul. 14, 2015, 4 pages.
Official Action for Canada Patent Application No. 2,843,041, dated Feb. 15, 2015 3 pages.
Extended European Search Report for European Patent Application No. 14155871.8 dated May 6, 2014, 2 pages.
Official Action for European Patent Application No. 14155871.8, dated Jul. 7, 2015, 5 pages.
Official Action for European Patent Application No. 14155871.8, dated Dec. 3, 2015, 4 pages.
Official Action for European Patent Application No. 14155871.8, dated Aug. 1, 2016 5 pages.
International Search Report and Written Opinion for International (PCT) Patent Application No. PCT/US16/31722, mailed Aug. 8, 2016, 9 pages.
Official Action for U.S. Appl. No. 12/185,006 mailed May 2, 2014, 6 pages Restriction Requirement.
Official Action for U.S. Appl. No. 12/185,006 mailed Dec. 1, 2014, 8 pages.
Notice of Allowance for U.S. Appl. No. 12/185,006, mailed Apr. 3, 2015, 8 pages.
Official Action for U.S. Appl. No. 14/709,286, mailed Aug. 19, 2015, 9 pages.
Official Action for U.S. Appl. No. 14/709,286, mailed Nov. 27, 2015, 11 pages.
Notice of Allowance for U.S. Appl. No. 14/709,286, mailed Feb. 9, 2016, 7 pages.
Official Action for U.S. Appl. No. 15/180,426, mailed Sep. 12, 2016 7 pages.
Official Action for U.S. Appl. No. 15/180,426, mailed Jan. 6, 2017 10 pages.
Notice of Allowance for U.S. Appl. No. 15/180,426, mailed Mar. 20, 2017 8 pages.
Official Action for U.S. Appl. No. 15/646,153, mailed Sep. 21, 2017 7 pages.
Notice of Allowance for U.S. Appl. No. 15/646,153, mailed Dec. 18, 2017, 4 pages.
Official Action for U.S. Appl. No. 15/945,277, dated Nov. 18, 2019, 8 pages.
Official Action for U.S. Appl. No. 15/945,277, dated Apr. 23, 2020, 9 pages.
Notice of Allowance for U.S. Appl. No. 15/945,277, dated Aug. 31, 2020, 8 pages.
Official Action for U.S. Appl. No. 17/141,214, dated Jun. 23, 2021, 6 pages. Restriction Requirement.
Official Action for U.S. Appl. No. 17/141,214, dated Dec. 7, 2021, 14 pages.
Official Action for U.S. Appl. No. 17/141,214, dated Jan. 25, 2022, 12 pages.
Notice of Allowance for U.S. Appl. No. 17/141,214, dated May 9, 2022, 8 pages.
Official Action for U.S. Appl. No. 17/902,065, dated Apr. 28, 2023, 8 pages.
Notice of Allowance for U.S. Appl. No. 17/902,065, dated Aug. 2, 2023, 5 pages.

* cited by examiner

METHOD AND SYSTEM FOR REMOVING HYDROGEN SULFIDE FROM SOUR OIL AND SOUR WATER

CROSS-REFERENCE TO RELATED APPLICATIONS

This application is a continuation of U.S. patent application Ser. No. 17/902,065 filed Sep. 2, 2022 (now U.S. Pat. No. 11,767,236, issued Sep. 26, 2023), which is a continuation of U.S. patent application Ser. No. 17/141,214, filed Jan. 4, 2021 (now U.S. Pat. No. 11,440,815, issued Sep. 13, 2022), which is a continuation-in-part of U.S. patent application Ser. No. 15/945,277, filed Apr. 4, 2018 (now U.S. Pat. No. 10,882,762, issued Jan. 5, 2021), which is a continuation of U.S. patent application Ser. No. 15/646,153, filed Jul. 11, 2017 (now U.S. Pat. No. 9,938,163, issued Apr. 10, 2018), which is a continuation of U.S. patent application Ser. No. 15/180,426, filed Jun. 13, 2016 (now U.S. Pat. No. 9,708,196, issued Jul. 18, 2017), which is a continuation-in-part of U.S. patent application Ser. No. 14/709,286, filed May 11, 2015 (now U.S. Pat. No. 9,364,773, issued Jun. 14, 2016), which is a continuation-in-part of U.S. patent application Ser. No. 14/185,006, filed Feb. 20, 2014 (now U.S. Pat. No. 9,028,679, issued May 12, 2015), which claims the benefit of U.S. Provisional Patent Application 61/768,029, filed on Feb. 22, 2013, the entire contents of which are each incorporated herein by reference in their entirety for all purposes.

FIELD OF THE INVENTION

Embodiments of the present invention are generally related to a system and method to remove hydrogen sulfide from sour water and sour oil. Particularly, hydrogen sulfide is removed from sour water and sour oil without the need for special chemicals, such as catalyst chemicals, scavenger chemicals, hydrocarbon sources, or a large-scale facility. The system and method in the present invention is particularly useful in exploratory oil and gas fields, where large facilities to remove hydrogen sulfide may be inaccessible. The present invention addresses the need for safe and cost-effective transport of the deadly neurotoxin. Particular embodiments involve a system and method that can be executed both on a small and large scale to sweeten sour water and sour oil.

BACKGROUND OF THE INVENTION

Exploration of gas fields can involve discovery of wells that contain significant quantities of hydrogen sulfide and other organic and inorganic sulfur compounds. Oil, natural gas, and water with a high concentration of sulfur compounds such as hydrogen sulfide and sulfur dioxide are referred to as "sour." Hydrogen sulfide is a colorless, toxic, flammable gas that is responsible for the foul odor of rotten eggs. It often results when bacteria break down organic matter in the absence of oxygen, such as in swamps, and sewers alongside the process of anaerobic digestion. It also occurs in volcanic gases, natural gas and some well waters. Sour oil and sour water are not only undesirable as sour products are economically useful, but they can also be extremely toxic and deadly because high levels of sulfur and sulfur byproducts. For example, hydrogen sulfide is a highly toxic and extremely deadly gas. The industry considers oil or water containing 100 parts per million ("ppm") (0.01%) sulfur sour oil and sour water. Although this is the minimum level, oil wells and water can contain higher amounts. Oil and water can contain hydrogen sulfide up to 300,000 ppm (30%) at the immediate gas/liquid interphase, the vapor space in a tank or container, and the atmosphere surrounding a spill. At higher concentrations, hydrogen sulfide is toxic and deadly.

As used herein, the term "sour oil" refers to oil containing levels of hydrogen sulfide in an amount greater than 100 ppm (0.01%). Sour oil can also mean oil containing 0.5% or more sulfur by weight. The term "sour water" refers to water containing hydrogen sulfide in an amount greater than 100 ppm (0.01%). The terms "sweet," "sweetened," and/or "sweetening" mean a product that has low levels of hydrogen sulfide, has had hydrogen sulfide removed, or the process of removing hydrogen sulfide. The term "stripping" means removing hydrogen sulfide from water and/or oil. The terms "acceptable limits" or "acceptable amounts" or "acceptable levels" refer to the maximum amount of hydrogen sulfide allowed according to any of the pertinent regulations. For example, the Environmental Protection Agency ("EPA") has certain regulations regarding the concentration of hydrogen sulfide that may be released into the environment. Furthermore, the Occupational Safety and Health Administration ("OSHA") provides certain regulations on the amount of hydrogen sulfide one may be exposed to without being considered a health hazard. There may be other regulations that apply, such as state regulations. The terms "acceptable limits" or "acceptable amounts" or "acceptable levels" can also refer to the maximum amount of hydrogen sulfide allowed in oil and/or water for a facility to accept the materials.

Exploratory and developmental wells with high concentrations of hydrogen sulfide, far away from hydrogen sulfide removal facilities present a problem of transporting the sour water and sour oil. Both liquids must be transported by truck, sometimes long distances over public and private roads. In most cases, sour water, which is dangerous to transport, will also not be accepted by most re-injection facilities if it contains more than a trace amount of hydrogen sulfide.

Similarly, sour oil, which is also dangerous to transport, will not be accepted by most refineries or pipeline hubs if it contains more than a trace of hydrogen sulfide. If one finds a facility willing to accept liquids with a high concentration of hydrogen sulfide, odds are they are hundreds of miles away from the exploratory well. A truck accident or a simple leak could endanger the transportation crew, as well as the public.

Raw or unprocessed crude oil is not generally useful in industrial applications, although "light, sweet" (low viscosity, low sulfur) crude oil has been used directly as a burner fuel to produce steam for the propulsion of seagoing vessels. The lighter elements, however, form explosive vapors in the fuel tanks and are therefore hazardous. Instead, the hundreds of different hydrocarbon molecules in crude oil are separated in a refinery into components which can be used as fuels, lubricants, and as feedstocks in petrochemical processes that manufacture such products as plastics, detergents, solvents, elastomers and fibers such as nylon and polyesters.

Petroleum fossil fuels are burned in internal combustion engines to provide power for ships, automobiles, aircraft engines, lawn mowers, chainsaws, and other machines. Different boiling points allow the hydrocarbons to be separated by distillation. Since the lighter liquid products are in great demand for use in internal combustion engines, a modern refinery will convert heavy hydrocarbons and lighter gaseous elements into these higher value products.

Oil can be used in a variety of ways because it contains hydrocarbons of varying molecular masses, forms and lengths such as paraffins, aromatics, naphthenes (or cycloalkanes), alkenes, dienes, and alkynes. While the molecules in crude oil include different atoms such as sulfur and nitrogen, the hydrocarbons are the most common form of molecules, which are molecules of varying lengths and complexity made of hydrogen and carbon atoms, and a small number of oxygen atoms. The differences in the structure of these molecules account for their varying physical and chemical properties, and it is this variety that makes crude oil useful in a broad range of several applications.

Once separated and purified of any contaminants and impurities, the fuel or lubricant can be sold without further processing. Smaller molecules such as isobutane and propylene or butylenes can be recombined to meet specific octane requirements by processes such as alkylation, or more commonly, dimerization. The octane grade of gasoline can also be improved by catalytic reforming, which involves removing hydrogen from hydrocarbons producing compounds with higher octane ratings such as aromatics. Intermediate products such as fuel oils can even be reprocessed to break a heavy, long-chained oil into a lighter short-chained one, by various forms of cracking such as fluid catalytic cracking, thermal cracking, and hydrocracking. The final step in gasoline production is the blending of fuels with different octane ratings, vapor pressures, and other properties to meet product specifications. Another method for reprocessing and upgrading these intermediate products (residual oils) uses a devolatilization process to separate usable oil from the waste asphaltene material.

Oil refineries are large scale plants, processing about a hundred thousand to several hundred thousand barrels of crude oil a day. Because of the high capacity, many of the units operate continuously, as opposed to processing in batches, at steady state or nearly steady state for months to years. The high capacity also makes process optimization and advanced process control very desirable.

Many steps may be involved in the refining of crude oil to produce desired products. At least two steps which are usually involved in refining of crude oil are fractional distillation and catalytic cracking. Typically, a crude oil feed is first provided to a crude tower. The crude oil will have been preheated and/or heat is provided to the crude tower by heating fluids such as steam. Lighter components of the crude oil are removed from upper portions of the crude tower while heavier components are removed from lower portions of the crude tower.

The heavy fraction, which is generally referred to as gas oil, is typically provided to a catalytic cracking unit which is generally referred to as the gas oil cracker. The gas oil is cracked to produce lighter, more valuable components in the catalytic cracking unit.

In the past, it has been common to dispose of components of the crude oil which are heavier than the gas oil and which were considered very low value products. However, as it has become necessary to process heavier crudes, it has become more economically desirable to process the components of crude oil which are heavier than gas oil.

It is well known that crude oil may contain components which make processing difficult. As an example, crude oil will generally contain metals such as vanadium, nickel and iron. Such metals will tend to concentrate in the heavier fractions such as the topped crude and residuum. The presence of the metals makes further processing of these heavier fractions difficult since the metals generally act as poisons for catalysts employed in processes such as catalytic cracking.

The presence of other components, such as sulfur and nitrogen, is also considered detrimental to the processability of the hydrocarbon-containing feed stream. Again, sulfur and nitrogen will tend to concentrate in the heavier fractions. Also, the heavier fractions may contain components (referred to as Ramsbottom carbon residue) which are easily converted to coke in processes such as catalytic cracking.

Processes used to remove components such as metals, sulfur, nitrogen and Ramsbottom carbon residue are often referred to as hydrofining processes (one or all of the described removals may be accomplished in a hydrofining process). Hydrofining processes are used in many refineries to facilitate the processing of heavy fractions of the crude oil such as topped crude and residuum.

In addition to removing undesired components, a hydrofining process will often reduce the content of heavies in the feedstock to the hydrofining process. This reduction results in the production of lighter components. Typically, when a hydrofining process is used in the refining of crude oil, the gas oil components withdrawn from the hydrofining process are provided to the catalytic cracking unit utilized to crack the gas oil withdrawn from the crude tower. Heavy fractions from the hydrofining unit are typically provided to a second catalytic cracker which is generally referred to as the heavy oil cracker.

In any process for refining crude oil, including processes where hydrofining is practiced, it is desirable to produce a product mix having the highest possible value. High value is determined by determining the amount of each product produced from a barrel of crude oil. The economic value of each product is then determined and a summation gives the value of the product mix. Even very small increases in the value of the product mix are extremely desirable because of the very large volumes of crude oil typically processed in a refinery and also because of the highly competitive of nature of the crude oil refining business.

Traditionally, crude oils are first distilled and then processed further as separate fractions. Conventionally, distillation is initially carried out under atmospheric pressure to produce various distillate fractions including naphtha and middle distillates, as well as an atmospheric residuum or "long" residuum which is then subjected to further distillation under vacuum to produce additional quantities of distillate material together with a vacuum residuum or "short" residuum. This processing scheme which initially separates the components of the crude according to their boiling points has conventionally been regarded as satisfactory because it enables the processing steps which follow the fractionation to be formulated according to the requirements of the individual fractions which vary not only according to their distillation characteristics but also in their chemical compositions.

Crude oil is generally associated with significant quantities of hydrogen sulfide and contains various other organic and inorganic sulfur compounds. Natural fossil fuels, such as crude oil and natural gas, that contain a substantial concentration of sulfur compounds, such as hydrogen sulfide and sulfur dioxide, are referred to as "sour." Sulfur compounds may evolve from fossil fuels over time and the evolution of these compounds produces significant environmental and safety issues. Emissions of various sulfur compounds, including hydrogen sulfide and sulfur dioxide are regulated. Due to enhanced regulations and restrictions, it is desirable to remove sulfur compounds from crude oil.

Exploratory and developmental wells with high concentrations of hydrogen sulfide, far away from hydrogen sulfide removal facilities present a problem of transporting the sour water and sour oil. Both liquids must be transported by truck, sometimes long distances over public and private roads. In most cases, sour water, which is dangerous to transport, will also not be accepted by most re-injection facilities if it contains more than a trace amount of hydrogen sulfide.

Similarly, sour oil, which is also dangerous to transport, will not be accepted by most refineries or pipeline hubs if it contains more than a trace of hydrogen sulfide. If one finds a facility willing to accept liquids with a high concentration of hydrogen sulfide, it may be hundreds of miles away from the exploratory well. A truck accident or a simple leak could endanger the transportation crew, as well as the public.

There are other problems downstream in the transportation of sour oil as well. For example, transport from the exploratory well to a treatment site is usually only the first step in the process. The oil typically has an end destination, whether it is another refinery, a distributer, or a consumer. One example can be seen in transportation of oil that is obtained through a fracturing or "fracking" process. Oil extracted through the fracking process typically is sweet and contains little hydrogen sulfide. This oil must be transported from the site to its end destination. The transportation can be hindered, however, if there is an upstream contamination of sweet oil with hydrogen sulfide of the shipping vessels or oils with different grades are mixed for shipping.

Rail shipment of crude oil has become an option for moving oil out of high production areas with little pipeline access. The shipping industry is adversely affected by having to address the shipping of hydrogen sulfide. The solution to rail safety issues are typically unanticipated costs, including rail car investments or new safety protocols to address the shipping of sour oil.

There is an ever-increasing shortage of naturally-occurring low sulfur crude oil. With the increasing emphasis on pollution control and the resulting demand for low sulfur content petroleum crude oil, a need for the economical production of sulfur-reduced crude has arisen.

Besides meeting enhanced regulations and restrictions, removal of sulfur from crude oil is desirable for other reasons. Not only does the evolution of sulfur compounds from crude oil produce significant environmental and safety issues, these compounds may also attack metal components of the oil well, as well as pipelines and storage tanks and downstream refinery apparatus. This attack causes corrosion and/or brittleness of the metal components. Additionally, in a refinery, downstream processes may utilize catalysts which are sensitive to the presence of sulfur.

In conventional oil refineries, sulfur is generally removed after the crude oil has been fractionated. Sulfur removal typically comprises utilization of various desulfurization processes, often requiring extreme operating conditions, and incorporation of expensive equipment, often associated with high maintenance costs.

Accordingly, there is a need in industry for systems and processes of removing sulfur from crude oil. Desirably, the system and method allow sweetening of crude oil proximal the removal of the oil from the earth.

Certain embodiments of the invention provide a system and a method for the removal of hydrogen sulfide from crude oil streams, such as sour oil streams. In some embodiments, the removal of hydrogen sulfide from sour water streams is additionally or alternatively provided. The method and system for the removal of hydrogen sulfide from a liquid crude oil stream is of lower-cost and of reduced environmental impact than traditional means. In some embodiments, a system and method to sweeten sour oil and water without a need to use hydrocarbons or other catalysts is provided. This is especially useful in the exploratory gas industry when access to traditional methods used to sweeten oil and water are not readily available and could be many miles away. Certain embodiments include a system and a method that comprise collecting the sour oil in a container, maintaining the sour oil in an air-free environment, adding water, and agitating the mixture. Other embodiments of the present invention include using sour water to remove hydrogen sulfide from sour oil.

SUMMARY OF THE INVENTION

The present invention relates to a system and method of processing of crude oil. In one embodiment, a system and method are disclosed wherein crude oil is processed in a first subsystem, such as a separator and/or heater, to separate oil components. The first subsystem provides, among other things, a stream of crude oil to a second subsystem, wherein hydrogen sulfide is removed from the crude oil. In one embodiment, the crude oil is bunker oil. Bunker oil is generally any type of fuel oil used aboard ships, commonly distinguished as two main types: distillate fuels and residual fuels.

Elemental sulfur and sulfur compounds are naturally present in many petroleum crude oils. For example, crude petroleum from Saudi Arabia contains about 5.0 weight percent sulfur, with sulfur containing compounds present in the crude often comprising high concentrations of hydrogen sulfide, which is a gas at room temperature. These sulfur compounds are unlikable because of their disagreeable odors and because they oxidize to sulfur dioxide or hydrogen sulfide which are corrosive. Sulfur containing crude oil can generate hydrogen sulfide and other sulfur containing gases during transportation and handling which poses a serious health hazard to workers in the immediate area around the crude. The corrosive nature of sulfur compounds contributes significantly to the costs of construction, operation, and maintenance of a petroleum refinery. As a result, crude oils and bunker oils that emit sulfur species have a low market value.

Lower-boiling hydrocarbons contain lower-boiling sulfur compounds and higher-boiling hydrocarbons contain higher-boiling sulfur compounds. Many prior art systems and methods have been employed to attempt to sweeten and desulfurize petroleum stocks, including oxidation reactions, solvent extraction, adsorption, and metal catalysis. Oxidation reactions require the addition of chemical reagents that oxidize sulfur components to form sulfides and/or disulfides, usually in the presence of undesirable metal reactants. Solvent extraction processes desulfurize sour hydrocarbons by extracting the sulfur components from the hydrocarbons with a suitable solvent that is immiscible with the hydrocarbons and typically require phase separation. Adsorption processes employ contact with a suitable high surface area adsorbent to desulfurize sour hydrocarbons, typically using refractory oxides such as silica and alumina or molecular sieves. Catalytic metals associated with porous supports have also been used to remove sulfur from sulfur-containing hydrocarbon streams. Still other processes employ elevated temperatures and pressures and large quantities of hydrogen gas in the presence of special catalysts to form hydrogen sulfide.

Oil, natural gas, and water with a high concentration of sulfur compounds such as hydrogen sulfide and sulfur dioxide are referred to as "sour." Hydrogen sulfide is a colorless, toxic, flammable gas that is responsible for the foul odor of rotten eggs. Hydrogen sulfide is a highly toxic and extremely deadly gas. The industry considers oil or water containing 100 parts per million ("ppm") (0.01%) sulfur sour oil and sour water. High concentrations of hydrogen sulfide, far away from hydrogen sulfide removal facilities, presents a problem of transporting the sour water and sour oil. In addition to ocean-going vessels of crude oil and the bunker oil employed as fuel therefore, rail shipment of crude oil and bunker oil is another option for moving oil out of high production areas with little pipeline access. The shipping industry is adversely affected by having to address the shipping of hydrogen sulfide. The solution to rail safety issues are typically unanticipated costs, including rail car investments or new safety protocols to address the transport of sour oil.

Even if the sour water and sour oil is treated to remove hydrogen sulfide content through conventional methods of using scavengers or other treating chemicals, facilities will not accept the treated water or oil if it contains too much of the treatment chemicals. This is especially problematic with wells containing high levels of hydrogen sulfide that require more of the treatment chemicals to remove the hydrogen sulfide concentrations. Added to these problems are the many regulations in place regarding the treatment and disposal of sour oil and sour water, such as OSHA regulations that require less than 10 ppm (0.001%) of hydrogen sulfide vented into the open air. With wells approaching or exceeding 10,000 ppm (1%) hydrogen sulfide, the cost of using liquid scavengers on the oil and water products exceeds the value of the oil itself after transportation costs. Such liquid scavengers are themselves very noxious chemicals and workers dealing with these chemicals must wear full HAZMAT suits. Hydrogen sulfide is lethal if inhaled in concentrations down to 1000 ppm (0.1%) in air or water or oil vapor. While at low concentrations, hydrogen sulfide has a characteristic smell of rotten eggs, at higher concentrations, the rotten egg odor is lost due to hydrogen sulfide fatiguing the sense of smell. In addition to the health hazards due to exposure to hydrogen sulfide, hydrogen sulfide is a flammable gas that creates additional transportation hazards.

In one embodiment, bunker oil is processed so as to remove sulfur (and other pollutants). Generally, the system and method are to make use of the addition of water and an emulsifying agent to heated bunker oil, thereby creating an emulsion of oil and water. The emulsion is then subjected to an electric field, microcavitation, and finally an electrolysis chamber. After the emulsion is separated, the cleaned "bunker oil" is sent to the storage tank, and the separated water is recycled (after the addition of caustic soda and/or magnesium oxide). Alternatively, or additionally, the process of FIG. 3 (described below) may be employed to, among other things, assist or enable the removal of hydrogen sulfide and/or sulfur.

Bunker oil requires cleaning, as it is the lowest grade of diesel fuel and generally contains high quantities of sulfur (3.5-4.5 by weight). When the fuel is used in the diesel engines of the cargo ships, high concentrations of sulfur and sulfur components are released into the atmosphere in the exhaust stream. Current methods to clean exhaust emissions (gas scrubbers and catalytic converters) are ineffective when initial sulfur content exceeds 1% by weight (sulfur clogs catalytic elements that remove NOx).

Many ports have issued regulations that limit pollutants, inclusive of sulfur, at concentrations below 0.5%. As such, cargo ships using high sulfur bunker oil as fuel must discontinue use of the diesel engines while in port and run an electric power line from shore to the ship, to power ship functions. This leads to higher cost of operation. If sulfur from bunker oil is removed while in the liquid state to, e.g. to levels below 0.5%, the resulting cleaned bunker oil in the diesel engines allows use of conventional methods of exhaust stream cleaning, such as scrubbers and catalytic converters.

More specifically, the process may be provided as comprising 3 phases, or stages. Each will be discussed in some detail. In a Stage 1: An Emulsifying agent is introduced into the untreated bunker oil, containing 3.5-4.5%, and is heated to "an appropriate temperature" to increase the likelihood of forming a stable emulsion with water. The heated bunker oil, containing the emulsifying agent, is then introduced to a mixing unit, where water is sprayed into the bunker oil, and mixed with the bunker oil, until an emulsion is created. The creation of the oil/water emulsion is accomplished by flow through nozzles which induce turbulent flow of the oil/water mixture and is stabilized by the emulsifying agent which was initially added to the oil prior to heating. During the mixing stage, a large amount of sulfur which was contained in the bunker oil is separated from the oil component of the fuel and transfers to either the water or a gaseous form of sulfur, such as hydrogen sulfide.

In one embodiment, the optionality exists to subject the oil/water emulsion to an electric field prior to entry into an oil/water separator, which is done to increase the amount of sulfur which leaves the bunker oil and combines either with the water or with hydrogen gas to form hydrogen sulfide in a gas form, which can be vented.

After separation at the end of Stage 1, the water used in Stage 1 is discarded as wastewater, and the fuel is then sent to Stage 2.

At Stage 2: The bunker oil is once again mixed with water to create a stable emulsion. Preferably, the emulsion in the second mixing stage is once again subjected to an electric field to increase the Sulphur quantity which leaves the bunker oil and is combined with the water, or forms vented hydrogen sulfide gas.

At Stage 3: After exiting the second mixer stage, the emulsion of water and bunker oil is sent to a microcavitation chamber in which high intensity acoustic waves are introduced to the emulsion to create cavitation bubbles in the emulsion. The cavitation process increases the amount of sulfur released from the bunker oil. After exiting the microcavitation chamber, the emulsion is once again subjected to an electric field in a "reaction chamber. Stated in more detail here, the electric current provides sufficient energy to strip additional sulfur molecules from the bunker oil, as well as to split some of the water molecules into gaseous hydrogen and oxygen. The hydrogen gas molecules have a high affinity for sulfur and will create hydrogen sulfide which can be vented. In addition, some of the hydrogen sulfide may dissolve into the water and create highly diluted hydrosulfuric acid.

The emulsion then exits the reaction chamber and is moved to a water/oil separator, where water is removed from the emulsion. The "cleaned" bunker oil is then sent to a fuel storage tank, and the water is recycled for use as makeup water in the first mixing stage (Stage 1). Sodium hydroxide may also be added to this recycled water stage, prior to being sent to the first mixing stage. Alternatively, magnesium oxide may also be added.

According to principles of the various embodiments as discussed herein, an apparatus and method are described which remove a large amount of the pollutants and, in particular, sulfur from the bunker oil while it is in the liquid state, prior to being further processed, or burned in a combustion engine. The system is able to operate to clean the fuel onboard the ship as it runs through fuel lines in preparation for being in the diesel engine. The system removes these pollutants, and in particular sulfur, from the bunker oil before it is placed in the fuel service tank so that as the oil is burned, the amount of sulfur in the exhaust gas is less than 0.5%. This is sufficiently low that an SCR catalytic converter and other scrubber can now be used to remove other pollutants from the exhaust smoke, such as NOx. Since the sulfur has been removed from the exhaust gas, an exhaust scrubber can now be used to remove many other pollutants from the exhaust gas since it will no longer be clogged with sulfur. The inventive system permits this achievement by removing sulfur from the bunker oil before it is burned to be within the limits needed for the exhaust gas scrubber to remove other pollutants.

The combination of the removal of sulfur from the liquid bunker oil followed by the removal of any additional sulfur along with a variety of other pollutants from the exhaust gas using the appropriate scrubbers and catalytic converter results in a substantially clean output from the exhaust stack on the huge cargo ship, permitting the cargo ship to dock in port and run its diesel engines while meeting all environmental regulations.

The system as described herein also enables the cargo ship to increase its exhaust gas efficiency and remove even more heat from the exhaust gasses than was previously possible. In the past, it was necessary to keep the exhaust gas at extremely high temperatures to avoid the sulfur condensing on the sidewalls of the smoke stack which would corrode and destroy the metal lining in a short period of time. With the inventive system as discussed herein, the exhaust gas is sufficiently free of sulfur that the temperature of the exhaust gas can be significantly lower. This permits the capture of substantially more energy from the burning of the diesel fuel and greatly increases the efficiency of the diesel engine itself as well as the exhaust gas boiler. As is known, the lower the temperature of the exhaust gas from a combustion system, the higher the overall efficiency since more energy has been extracted from the combustion cycle. Accordingly, by permitting a lower exhaust gas temperature, the fuel-efficient operation of the cargo ship as a whole can be greatly increased.

According to one embodiment, the system includes a fuel flow line through which bunker oil can flow from a storage tank. After the fuel leaves the storage tank, an emulsifying agent is mixed with the fuel in one embodiment in order to increase the affinity of the oil mixing with water. The fuel line then enters a heat exchanger followed by a heater in which it is heated to an appropriate temperature to increase the likelihood of mixing with water. Next, the fuel enters a mixing unit, in which water is sprayed into and mixed with the bunker oil, creating an emulsified blend of diesel fuel and water. The mixing is subject to highly turbulent flow and sprayed through nozzles to encourage complete mixing with the water and oil.

In one embodiment, during the mixing stage, an electric coil that is wrapped around the mixer stage subjects the emulsified fluid to an electric field. The emulsified mixture exits the mixing stage and enters a water/oil separator stage which separates the water from the oil. During the mixing stage, a large amount of the sulfur which was contained in the bunker oil is separated from the oil component of the fuel and transfers to either the water or a gaseous form of sulfur, such as hydrogen sulfide. In a first separator stage, the water which has been separated from the fuel is discarded as waste water and the fuel is output to a pipe to enter a second mixer stage. In the second mixer stage, the fuel is once again mixed in a turbulent flow with water to create an emulsion that contains water and oil. Preferably, during the mixing in the second stage, the emulsion is subjected to an electric field in order to increase the quantity of sulfur which leaves the bunker oil and combines either with the water or with hydrogen gas to form hydrogen sulfide in a gas form, which can be vented.

After the emulsion exits from the second mixer stage, it passes through a microcavitation chamber in which the emulsion is subjected to high intensity acoustic waves that create cavitation bubbles in the emulsion, further increasing the separation of sulfur from the bunker oil. The emulsion then exits the microcavitation and enters a reactor chamber in which an electric current is passed through the emulsion. The electric current passing through the emulsion adds additional energy to further separate individual components of the emulsion. In particular, the electric current which passes through the emulsion will provide sufficient energy to strip some of the remaining sulfur atoms from the bunker oil. In addition, the electric current will provide sufficient energy to split some of the water molecules into the gaseous components of hydrogen and oxygen, creating bubbles of hydrogen and oxygen. The gas bubbles of hydrogen will have a great affinity for the sulfur and will create gas molecules of hydrogen sulfide which can then be safely vented from the reactor chamber. In addition, some of the hydrogen sulfide may dissolve into the water and create a highly diluted hydrosulfuric acid. The electrolysis of the emulsion also creates oxygen gas from the splitting of the water molecule and the individual oxygen atoms quickly combine either with another oxygen atom to create oxygen or with other pollutants in the oil, for example lead resulting in lead oxide; arsenic, resulting in arsenic trioxide sulfur to create sulfur dioxide; or other compounds of oxygen. The emulsion exits from the reactor and enters a water-fuel separator where the water is removed from the oil. The twice cleaned fuel is output for storage in a fuel storage tank and the water is input as the water mixture to the first mixture to be used for mixing with the oil in the first mixer to create the first emulsion.

In one embodiment, prior to the cleaning water being inserted into the mixer of the second stage, one or more treatment chemicals may be added to the water in order to increase the solubility to sulfur. For example, one of the chemicals which may be added in is sodium hydroxide, as known as caustic soda. This creates a strong alkaline solution of the water which, when mixed with the oil, assists in the separation of sulfur from the bunker oil. Sodium hydroxide in water will act to dissolve grease, oil fats and protein deposits. Another chemical which may be used is magnesium oxide which can react with the sulfur in the bunker oil to create magnesium sulfide which is a salt that can be easily removed from the bunker oil. This also provides additional hydrogen atoms to combine with the sulfur to create $H_2S$ and remove the sulfur from the bunker oil compound.

Fuel which passes through the two-stage mixer and water-fuel separator system has been found to have substantial portions of the sulfur removed, resulting in bunker oil which is sufficiently free of sulfur (in the range of 0.5% or lower), and other contaminants that it can be burned while in port and meet pollution control standards. It also permits use of smokestack scrubbers and catalytic converts in the output exhaust to further remove other contaminants which has not been previously possible for large cargo ships burning standard bunker oil.

Various embodiments of the present invention are directed to the removal of undesired sulfur compounds, including hydrogen sulfide gas, from oils, and in particular crude oil. The transport of oil in ocean-going vessels, such as tankers, typically involves simply filling of such massive ships with oil and the transit thereof to a distant shore, where the oil is then off-loaded and then refined to various stages at a refinery. One aspect of the present invention is directed to the ability to conduct certain processing of the oil while it is in transit to improve the quality of the oil upon arrival at the tanker's destination. Thus, in several embodiments of the present invention a system and method are described that includes the reduction of sulfur compounds, and especially hydrogen sulfide, from oil being transported—while it is being transported. Achievement of this objective preferably involves the simple employment of water (whether fresh or sea water) and air, and by processing the oil contained on a tanker by the described contact with the water, followed by the water being contacted by additional air, the sulfur load of the oil being transported is effectively reduced, all without the employment of expensive chemicals.

Yet other aspects of the present invention are directed to similar sulfur content reductions in oil, including hydrogen sulfide, where the oil is selected from the group consisting of crude oil and bunker oil, a very low quality, dirty fuel of a low grade that is typically used as fuel to power the engines of large ships, including tankers that transport crude oil, as well as large cargo ships, container ships, and luxury cruise liners. Bunker oil contains a high amount of sulfur in the range of 3%-5%. Traditionally, removal of sulfur from bunker oil has not been attempted due mainly to the time and costs involved. In the past, with the absence of air quality regulations, ships were able to use and burn high sulfur oil in a large cargo and tanker ships with little concern. But those days are in the past. Increasingly, the burning of such dirty, low quality bunker oil is being prohibited in ports where such large ships depart and arrive. Various ports around the world are issuing regulations that limit the amount of sulfur emissions from a ship while it is within the port boundaries, with a typical restriction being that the bunker oil contain less than 0.5% sulfur before it can be used to power a diesel engine within the port boundaries. Since bunker oil having such a low sulfur content is not available on the market, many ship operators must completely shut down their diesel engines when they are docked at a port and use land electric lines for powering systems on the ship which can be extremely expensive for the city to provide the high power capacity of a ship and also expensive for the ship operator to purchase the electricity. Removal of sulfur from exhaust gas of engine ships is impracticable as traditional exhaust gas scrubbers only work when sulfur level is below 1%. There is therefore a long felt but unsolved need for a way to reduce the amount of sulfur in bunker oil, as well as in the oil being transported by oil tankers, including the removal of hydrogen sulfide from such oils, in a safe and economical manner. As described herein, the present invention addresses these problems in an economical, simple manner.

The present invention can be used with sour water and sour oil with high levels of hydrogen sulfide as well as lower levels. The hydrogen sulfide is removed without specialized equipment or expensive chemicals. The sweetened water or sweetened oil can be transported without placing those involved in handling and transportation at risk of potentially fatal mishaps and minimizes and environmental hazards.

As used herein, the term "sour oil" refers to oil containing levels of hydrogen sulfide in an amount greater than 100 ppm (0.01%). Sour oil can also mean oil containing 0.5% or more sulfur by weight. The term "sour water" refers to water containing hydrogen sulfide in an amount greater than 100 ppm (0.01%). The terms "sweet," "sweetened," and/or "sweetening" mean a product that has low levels of hydrogen sulfide, has had hydrogen sulfide removed, or the process of removing hydrogen sulfide. The term "stripping" means removing hydrogen sulfide from water and/or oil. The terms "acceptable limits" or "acceptable amounts" or "acceptable levels" refer to the maximum amount of hydrogen sulfide allowed according to any of the pertinent regulations.

In certain embodiments, the invention comprises an air source, a tank, a plurality of lines that distribute air from the air source to the tank and a vent stack, connections that distribute the air from the air source into the tank, a hydrogen sulfide monitor, and a vent stack connected to the water tank and air source. The air from the air source runs to a tank filled with sour water through an airflow line. The airflow line is connected to a pipe with at least one hole. The pipe is located in the water tank. A second line runs to the vent stack through a second airflow line. In certain embodiments, air flows to the vent stack at a rate of 120 standard cubic feet per minute ("scf/m"). The airflow may be adjusted incrementally every hour for twelve hours. The air distribution ratio may be adjusted hourly. The amount of hydrogen sulfide is measured near the top of the vent stack. The air with the acceptable levels of hydrogen sulfide is then vented. The plurality of lines running from the air source are secured by typical ways known to those skilled in the art to connect air lines to air source. Embodiments of the present invention ensure that any materials containing hydrogen sulfide are enclosed within the invention and not exposed to the outside environment. As those skilled in the art will recognize, the air source can be any air source able to generate air, such as a compressor or a blower.

U.S. Pat. No. 3,547,190 issued to Wilkerson ("Wilkerson"), describes an apparatus and method for treating wastewater associated with hydrocarbon production. Wilkerson is incorporated by reference in its entirety. According Wilkerson, waste water from a well is pumped under pressure to a plurality of spray nozzles which are disposed in such a manner as to spray the water into the atmosphere in a substantially vertical direction in open air. The sprayed water is thus aerated to remove the residual hydrogen sulfide therefrom and reduce its temperature. The water is then collected in a basin wherein any excess oil still associated with the water may be skimmed from the surface of the water. The method described in Wilkerson would lose efficiency as the temperature of the process water decreases from boiling point. In some specific field applications where water coming from the well itself is very hot, this method may be useful. For all other field applications, there are problems with its implementation. For example, it operates in a fairly narrow envelope of parameters, both mechanical and process. Nozzle-size and upstream pump pressures will be fairly critical. It may result in mist (as opposed to vapor) being blown onto adjoining property, legally a spill. Wilkerson requires hot water for efficiency and may not be suitable for cold-weather applications, regardless of the temperature of the initial process water.

Of note, Wilkerson vents hydrogen sulfide without regard to safely breathable concentrations. Any hydrogen sulfide not vented in the initial pass vents from an open body of water at a rate that is both difficult to measure and difficult to control. This particular method is very problematic in this regard, and as those skilled in the art can recognize, the present invention alleviates the safety hazards associated with releasing hydrogen sulfide into the environment. Although it is known in the art that exposing water or oil containing hydrogen sulfide to air will remove hydrogen sulfide, embodiments of the present invention allow the aeration to remove hydrogen sulfide in an enclosed environment to eliminate any safety risks and environmental hazards associated releasing hydrogen sulfide in an open environment.

In other embodiments, the present invention comprises a container filled with water, a separate container filled with oil, a means to distribute water from the container filled with water to the container filled with oil. The water can be sweet water or sour water having a sour concentration less than that of the sour oil. The water travels through the sour oil as it has a lower specific gravity. This travel through the oil creates an agitation, and the hydrogen sulfide is removed from the oil as the water passes through the oil. The agitation occurs at the oil/water interface. Oil will release hydrogen sulfide into the water wherever water containing a lower hydrogen sulfide concentration contacts oil containing a higher hydrogen sulfide concentration.

U.S. Pat. No. 3,977,972 issued to Bloch et al. ("Bloch") describes a system and a method to remove hydrogen sulfide from seal oil through bubbling a gas such as nitrogen. Bloch is incorporated by reference in its entirety. Bloch's preferred embodiment contains a compressor having a shaft which rotates in a pair of liquid-film seal cartridges which serve as seal retainer housings for the rotary shaft of the compressor. Each of the liquid-fill seal cartridges includes a pair of floating, non-rotation sleeve portions surrounding the shaft and interconnected by an intermediate space portion through which the shaft freely extends. Contaminated oil is then transferred to a cylindrical drum, where the diameter of the drum may be on the order of two feet while its height may be approximately twice the diameter. The lower interior portion of the drum is provided with a baffle in the form of a simple flat sheet of metal extending upwardly approximately 2 feet from the bottom of the drum to divide the lower interior portion of the drum into a pair of chambers which has a cross section of a semicircle. Contaminated seal oil flows into one of the chambers, where a sparger means bubbles up air or nitrogen through the oil. The oil flows to the second chamber, where a sparger means bubbles up air or nitrogen through the oil. Bloch, while possibly suitable for refined seal and lubrication oils that may become contaminated by higher sulfur fuels, is neither suitable nor safe to use with crude oils or any other oil that releases combustible case into the air. Although the use of pure nitrogen or another inert gas might address combustion problem, it is impractical and uneconomical to obtain a pure nitrogen source at exploratory sites, and would also create a low oxygen environment (breathable oxygen) in the area near the vent. Neither is it suitable for higher concentrations (above 10 ppm) of hydrogen sulfide due to its direct, un-diluted vent. As those skilled in the art can appreciate, the use of water to remove hydrogen sulfide content in oil reduces the risks associated with adding an outside air source to a combustible material such as oil.

In certain embodiments, nitrogen can be used to keep the oil-water interface fresh, where the water agitation sweetens the oil. Nitrogen is introduced into the bottom of the oil stripping tank periodically at a low volume, for example, at a rate of 10 standard cubic feet every 15 minutes as an additional safety measure to prevent flammable gas buildup.

In certain embodiments, the present invention comprises a tank with a mixture of sour oil and water, a separate tank with sour water, air distributors pumping air through the tank with sour water to remove hydrogen sulfide, pumping the sweetened water into the tank containing the oil and water mixture, and allowing the water from the oil and water tank to flow into the sour water tank through a gravity-feed. As those skilled in the art can appreciate, the present invention is an improvement to the prior art that requires the use of catalysts, scavengers or other expensive and specialized equipment.

Certain embodiments of the present invention can be implemented using containers typically used in the oilfield, such as commonly used 500 barrel "frac" tanks and 400-barrel cylindrical upright tanks. In one embodiment, a 185 scf/m air compressor derated for 5000 feet elevation to 140 scf/m can be used as the air source. A disperser bar with at least one hole is placed in the water tank. The disperser bar can be 1" or 1.5" pipe. The vent line from the water tank to the vent stack is 3" in diameter.

The equipment described herein is provided as an example only and should not be construed to limit the present invention, as the present invention can be used in almost any scale, For example, the present invention can be used with samples smaller than 500 ml oil or water as well as tanks having a volume in excess of 1000 barrels.

For example, certain embodiments comprise equipment that can be placed in mobile transportation, such as a trailer or the back of a pickup truck. Certain tanks, which are commercially available, are designed to fit in the back of a pickup truck. This embodiment allows easy transport and allows sour oil and sour water located in remote locations where larger equipment is uneconomical, impractical, or impossible because of the remote area.

In certain embodiments, the equipment can be placed in a tow trailer, where the invention comprises a configuration comprising an automation cabinet, an air source, a power source, such as a generator, a water pump, and hose or piping connectors. As those skilled in the art can appreciate, variations of this embodiment can also be practiced with other types of tanks that are mobile and can be transported from site to site, and are within the spirit of the invention. The descriptions herein are not intended to limit the present invention.

In certain embodiments, the invention comprises an air source, a plurality of storage devices, connections that distribute the air from the air source into a storage device comprising water, and a vent stack connected to the storage device comprising water and air source. The air from the air source runs to the storage device comprising sour water through an airflow line. The airflow line is connected to a pipe with at least one hole. The pipe is located in the storage device comprising sour water. A second line runs to the vent stack through a second airflow line. In certain embodiments, air flows to the vent stack at a rate of around 120 scf/m. The airflow may be adjusted incrementally every hour for twelve hours. The air distribution ratio may be adjusted hourly. The amount of hydrogen sulfide is measured near the top of the vent stack. The air with the acceptable concentrations of hydrogen sulfide is then vented. The sweetened water is then pumped from the water tank to a second storage device comprising a mixture of sour oil and water through an attachment connecting the water tank to the top of the second storage device comprising sour oil and water. The storage device comprising a mixture of sour oil and sour water is equalized. For example, in embodiments comprising 400- or 500-barrel tanks, a suitable rate would be pumping water from the storage device comprising water into the storage device comprising the mixture of sour oil and water at a rate of 3 barrels per minute. Other rates are also possible, such as rates as low as 20 to 50 gallons per minute or as high as 10 to 20 barrels per minute. As the water passes through the oil due to its higher specific gravity, hydrogen sulfide is removed from the oil. The water that is now at the bottom of the storage device comprising oil and water has higher concentrations of hydrogen sulfide. The water from the bottom of the storage device comprising oil and water flows back to the storage device comprising water due to hydrostatic pressure, i.e., a "gravity feed," through an attachment between the bottom of the storage device comprising oil and water tank and storage device comprising water. The water is then stripped to remove hydrogen sulfide so that the concentrations of hydrogen sulfide reach a level that is acceptable to vent. Embodiments of the present invention ensure that any materials containing hydrogen sulfide are enclosed within the invention and not exposed to the outside environment.

Certain embodiments of the invention include a cavitation vent to keep air out of the oil stripping tank.

In certain embodiments of the invention, the water used in the stripping process comprises a pH of approximately 7.2 or below. In certain embodiments, the removal of all hydrogen sulfide may be desired. In embodiments where all hydrogen sulfide is desired to be removed, the hydrogen sulfide could be completely removed when fluid temperatures are above degrees Fahrenheit.

Another embodiment of the invention includes a way to automate regulation of air distribution. In certain embodiments, a loop controller is attached to a hydrogen sulfide sensor monitoring the concentration of hydrogen sulfide from the vent stack. In this embodiment, the loop controller is attached to the vent stack, the air line to the water stripping tank, and the air line to the vent stack. The loop controller is used to keep the air vented below 10 ppm. The loop controller is connected to a current to pressure converter ("I to P converter"). In certain embodiments, the I to P converter converts the controller 4 to 20 ma output to 0 to 15 psi pneumatic. As those skilled in the art can appreciate, different types of I to P converters may be used with the present invention, and the I to P converter described herein is not intended to limit the present invention.

Certain embodiments include at least one I to P converter. A specific air line could be regulated by a dedicated I to P converter. In other embodiments, the I to P converter could regulate a plurality of air lines. In preferred embodiments, the use of one I to P converter may be advantageous because it assures a "safe state" upon loss of control signal (either electric or pneumatic) where all the air would divert into the vent stack, and the valves would return to their default position.

Based on the information received from the loop controller, the I to P converter or converters will send more air to the air line connected to the vent stack and less air to the air line connected to the tank comprising water, i.e., the water stripping tank, as the hydrogen sulfide stream exceeds 10 ppm when the hydrogen sulfide monitor reads a concentration exceeding 10 ppm. If a concentration detected by the hydrogen sulfide sensor falls below 10 ppm, the loop controller sends more air to the air line connected to the water stripping tank. In certain embodiments, the loop controller could be calibrated where it would reset at a one-minute interval and calibrated so that there is a variance range of 2 to 3 ppm where no change in control to the air lines would be transmitted.

In certain embodiments, the automation can be controlled with an automation control. The automation control allows for measurement of the number of barrels of oil sweetened by the present invention.

In certain embodiments, the automation control comprises a programmable logic controller ("PLC"), a plurality of compartments, an air source, connections that distribute the air from the air source to the desired compartments, a pumping means, sensors, sensor cables, and a vent stack connected to a compartment comprising water. A first compartment is filled with water which can comprise hydrogen sulfide. A second compartment is filled with a mixture comprising sour oil and sweet water in an equalized amount. The sensors are attached by sensor cables to the compartments comprising water, sour oil and water, and a vent stack. Water from the first compartment is distributed to the second compartment through a connection located at the top of the second compartment. As the water passes through the oil due to its higher specific gravity, hydrogen sulfide is removed from the oil. The sensor in the second compartment detects the amount of hydrogen sulfide in the second compartment. The water that is now at the bottom of the second compartment has higher concentrations of hydrogen sulfide. The water from the bottom of the second compartment flows back to the first compartment comprising water due to hydrostatic pressure through an attachment between the bottom of the second compartment and the first compartment. The sensor in the first compartment measures the amount of hydrogen sulfide in the first compartment. The sensor in the vent stack also measures the amount of hydrogen sulfide in the vent stack. Air is distributed to the first compartment from the air source through an airflow line. The sensor in the first compartment measures the amount of hydrogen sulfide present in the first compartment. The sensor in the vent stack measures the amount of hydrogen sulfide present in the vent stack. Once the sensor detects the amount of hydrogen sulfide is within the desired limit programmed into the PLC, air is automatically vented. Sweetened water is then pumped from the first compartment to the second compartment. As those skilled in the art can appreciate, the sensors monitor the amount of oil sweetened by the process.

In other embodiments, the data regarding the number of barrels of oil sweetened is transferred remotely to a database where the number of barrels of oil sweetened can be stored and analyzed. This data transfer can occur via wireless means including cellular internet protocol, Bluetooth, or other wireless data transfers.

Other embodiments use a high pressure, low volume water pump to circulate stripped water through a sample to remove hydrogen sulfide. These embodiments comprise an air compressor or air pump, a container used as a water stripping reservoir, a high pressure, low volume pump, a relief regulator, a container filled with an oil sample pressurized to the sampled psi, a container filled with a water sample, and a liquid pressure regulator. The air compressor or air pump pumps air into the reservoir containing water to be stripped. For example, a Coralife SL-381.3 scfm pump may be used. Air is then pumped into a water stripping reservoir. The water stripping reservoir is at atmospheric pressure. An example of the water stripping reservoir may comprise a plastic or metal material with a five- to ten-liter capacity. The water stripping reservoir is filled to ¾ or ⅝ of its volume capacity with distilled water. Water from the water stripping reservoir then travels to a high pressure low volume pump. The pump may comprise a pneumatic pump or an electric pump. For example, the pump may comprise a Texsteam 5000 series. A relief regulator is connected to the high pressure low volume pump, and vents as necessary. As an example, the relief regulator may be set at the sample container MAOP, such as 2000 psi. The water from the high pressure low volume pump then travels to a container with the oil sample. For example, certain embodiments may use a 1000 cubic centimeter ("cc") container, pressurized at 75 psi. The water passes through the oil sample container to a separate container, containing a water sample. In certain embodiments, the container for the water sample may comprise a 1000 cc container. The water then passes from the water container back to the water stripping reservoir. A liquid pressure regulator may be attached to the line traveling from the container with the water sample to the water stripping reservoir. The liquid pressure regulator may be set at the oil sample pressure, e.g. 75 psi.

In yet another embodiment, the present invention comprises a container filled with water, a separate container filled with oil, a distributing means that distributes water from the container filled with water to the container filled with oil.

In certain embodiments, the invention includes of filling a tank with sour water, aerating the sour water to strip the sour water of entrained hydrogen sulfide gas, pumping the sweetened water into a separate tank comprising an equalized mixture of sour oil and water, removing hydrogen sulfide from the sour oil, pumping the resulting sour water into the tank filled with sour water.

In certain embodiments, the invention includes components that can be used in remote areas, such as exploratory wells. As those skilled in the art can recognize, the invention eliminates the need for expensive and specialized equipment that is currently used to remove hydrogen sulfide from sour water and sour gas. Furthermore, the invention can be used to strip sour water and treat sour oil containing hydrogen sulfide in any amount, even exceeding 300,000 up to saturation—an amount higher than equipment that taught in the prior art. For example, U.S. Pat. No. 5,286,389 issued to Hardison (the "Hardison '389 patent"), incorporated in its entirety by reference, describes a system and apparatus to strip hydrogen sulfide from water. The Hardison '389 patent specifically teaches that the apparatus and method are particularly effective to treat sour water containing around 5 ppm to 500 ppm hydrogen sulfide. Thus, the Hardison '389 patent teaches away from using such prior art with water containing high levels of hydrogen sulfide. The levels of hydrogen sulfide do not influence the present invention, and the present invention can be used with materials containing very high levels of hydrogen sulfide.

U.S. Pat. No. 6,444,117, issued to Kahn et al. ("Kahn"), describes a process for desulfurizing sulfur-containing crude oil streams. Kahn is incorporated by reference in its entirety. Kahn requires heating the sulfur containing crude oil to an elevated temperature to at least 300 degrees Fahrenheit (149 degrees Celsius) to about 600 degrees F. (316 degrees C.) for an extended period of time, stirring and bubbling an inert gas, such as nitrogen into the crude oil, and adding a scavenger or catalyst into the crude oil stream to generate an exhaust gas such as hydrogen sulfide. Kahn requires a careful monitoring of and control liquid temperature to remain safe. Its maximum efficiency envelope immediately borders the flash-point of the oil sweetened (unsafe). These parameters must be monitored and controlled constantly and will vary widely with different types and grades of crude oil. Kahn acknowledges that additional steps may be required to reduce the amount of hydrogen sulfide generated by heating the crude to the levels described. Kahn vents both hydrogen sulfide and low-oxygen mixture without regard to safely breathable considerations. As those skilled in the art can appreciate, the present invention is a much simpler process that is much safer than what is known in the prior art.

United States Patent Application No. 2013/0324397, by Wilson et al. ("Wilson") describes using a carbon adsorbent for hydrogen sulfide removal. The hydrogen sulfide adsorbent is added to the material containing hydrogen sulfide. Wilson is incorporated by reference in its entirety.

The present invention involves a system and a method that removes hydrogen sulfide from water and oil in a very cost-effective manner. Furthermore, certain embodiments allow the hydrogen sulfide to be removed on-site at remote locations, such as exploratory wells. Certain embodiments allow removal of hydrogen sulfide from water and oil, diluting the concentration to amounts that can be safely vented into the environment, in accordance with current environmental and safety regulations and without endangering anyone in the surrounding area, any animal in the surrounding area or the environment.

The present invention also reduces sulfur by weight. Typical worldwide definition for sour oil is generally about 0.5% sulfur by weight. The present invention can be used to sweeten oil such that the oil is lower than the 0.5% acceptable rate.

Other embodiments are directed to improving the price spread, which is the value of sweet oil versus sour oil, measured in dollars. The price spread can vary between $5 USD and $16 USD per barrel. It is difficult, and not usually feasible, to blend out high volumes of hydrogen sulfide in oil. It is not difficult, but may be costly, to blend out high sulfur weights. One would have to blend a prohibitive amount of 0% ppm hydrogen sulfide with 10,000 ppm oil in order for the resulting total volume to currently accepted limits of 0.5% or 5 ppm. By first treating oils as described herein, then blending oils in a 1:1 ratio or equal volumes of 0.1% sulfur by weight would result in a sweet-price oil. Blending is typically expensive, but by first treating oils as described herein, provides a low-cost method of minimizing the post-process blending ratio, or eliminates the need to blend oils to increase the price spread.

Certain embodiments of the present invention include a plurality of tanks containing different levels of sour oil. The oil in one of the tanks can be treated to remove hydrogen sulfide and then blended with oil from another tank to improve the price spread.

Other embodiments comprise an additional chamber where the removal of hydrogen sulfide from the air can be further stripped thus increasing the rate of hydrogen sulfide removal before venting once the hydrogen sulfide levels are within the desired limits.

In yet another embodiment, the system and method comprise safe transport of sour water and sour oil from a remote area such as an exploratory well. High concentrations of hydrogen sulfide are extremely toxic and deadly. Transportation of such materials is extremely dangerous and puts everyone involved at risk, from the personnel handling the materials at the site, those involved in loading the transportation vehicle, the driver of the transportation vehicle, to the personnel at the treatment plant unloading the toxic materials. The danger of a deadly mishap increases as more people have to handle the toxic materials, and the greater the distance traveled further puts the handlers at risk. In certain embodiments, the present invention involves a system and method to neutralize the risk involved in transporting toxic materials, such as sour water and sour oil with high concentrations of hydrogen sulfide. As those skilled in the art can appreciate, the present invention renders the transport of materials high in hydrogen sulfide unnecessary, thus improving the safety to those involved in transporting the materials, and reducing liability that may result should an accident occur during transportation.

Use of the current invention at exploratory wells is especially beneficial. For example, when a crew is at an exploratory well, they test to see the quality of wells for hydrogen sulfide. At some wells, the levels are extremely high, and cause a danger to any person in the area. In order for samples to be provided for further analysis, the crew subjects themselves to the danger not only in the levels of hydrogen sulfide in the sour oil and sour water, but also dangers in transporting samples. In order to transport any of the sour oil or the sour water, a crew would have to wear full protective gear to load the truck tankers. Then the crew would have to travel over arduous roads with sour oil or sour water containing hydrogen sulfide in such high concentrations that it could cause sudden death. Any accident along the way would release such hazardous chemicals, and could kill the drivers, as well as due extensive harm to the environment. Even when the drivers reach the sample or treatment facility, the crews at those facilities are placed at risk. Any error in the process could prove fatal.

The present invention neutralizes this risk. In certain embodiments, there is no need for expensive chemicals, which themselves are hazardous, and the invention eliminates the need to haul a potentially deadly toxin or toxins long distances, whether hydrogen sulfide, chemical scavengers, chemical catalysts, or other chemicals. Other embodiments allow oil and water with high concentrations of hydrogen sulfide to be sweetened on site before loading the trucks to transport, transporting the sweetened water or oil, and unloading the sweetened water or oil at a facility that will run further analysis or even to sell the sweetened oil.

For example, in certain embodiments, sour oil or sour water would be detected at an exploratory site, far away from a facility that could treat the sour oil or sour water to remove levels of hydrogen sulfide. In this embodiment, the sour water and sour oil is treated in accordance with the present invention at the exploratory site for easy transportation. This includes aerating sour water contained in one tank, monitoring the amount of hydrogen sulfide concentration in the water tank, venting air from the vapor space of the water tank when the hydrogen sulfide is at acceptable levels, pumping the sweetened water from the water tank into a separate tank containing an equalized sour oil and water mixture, continuing to pump water into the tank containing the oil and water mixture until the amount of hydrogen sulfide in the oil is at acceptable levels, returning water from the tank containing oil and water to the water stripping tank, continuing to aerate the water until the levels of hydrogen sulfide are acceptable. Then, the oil is removed from the tank containing oil and water, loaded into another container for shipment, such as a tanker. The oil, having little to no hydrogen sulfide content is then transported from the exploratory site to a destination where the oil could be subjected to other tests, or even sold. The water could be re-used in the process, or could be transported from the exploratory site to a destination for further testing or disposal. As those skilled in the art can appreciate, the risks involved in transportation of materials containing hydrogen sulfide is reduced or eliminated, as the transported materials contain little or no hydrogen sulfide. In other embodiments, the invention addresses an unknown danger except for those involved regarding transportation of sour oil or sour water. In certain embodiments, the transportation method comprises shipping oil or water via a common carriers or private carriers, including via FedEx or UPS. Since there is little to no hydrogen sulfide in the materials, no additional precautions need to be taken to ship the materials.

Other embodiments of the present invention include a container that indicates the levels of hydrogen sulfide in the materials within the container. In these embodiments, the container provides a certain indication that the levels of hydrogen sulfide are below toxic amounts and can be transported safely. The container and display can be calibrated according to the relevant regulations to indicate when the hydrogen sulfide level content is below the required levels. This is particularly useful when further analysis on samples from a remote well need further analysis at an off-site location. One of the important aspects of the present invention is its flexibility to be used in multiple scales. Thus, hydrogen sulfide can be removed from smaller volumes of sour water or sour oil by the present invention, such as within a specialized container that indicates that the materials within the container are safe to ship. In another example, the calibration can be set to indicate that no hydrogen sulfide is present, and the oil could be sold to a refinery.

Yet another embodiment of the present invention comprises an indicator that displays a corresponding message or display regarding the amount of hydrogen sulfide content in the materials to be shipped. The indicator can be integrated with a container, or as a stand-alone indicator. The indicator displays information on proper handling of the materials that are to be transported. With the information, decisions on safe handling and safe shipping of the materials can be made. For example, a decision to ship the materials via truck, via parcel, via common carrier, or whether the materials are even safe to transport at all can be made from the information. For instance, if the indicator displays that the hydrogen sulfide level is close to zero, this indicates safe shipping by any shipment method that would allow the transport of non-hazardous materials like those being shipped.

While various embodiments the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as additional items.

In one embodiment, the present invention further involves the combining of heavy oil with water to form a heavy oil/water mixture, subjecting the oil water mixture to ultrasonic waves to create bubbles, and in certain cases, heating the mixture between 150 degrees C. and 350 degrees Celsius. This is distinguished from prior art system, for example those that require a high-pressure system that involve complex equipment and a highly controlled environment. Other prior art systems employ expensive systems that use electrodialysis or membranes and which require complex mechanical and process parameters not suitable for field use and that are not at all not portable.

In one embodiment, the present invention is devoid of the use of a membrane to remove hydrogen sulfide from sour water. Furthermore, the present invention does not require a steam-stripping process.

Other methods of removing hydrogen sulfide from water involve using a high voltage electrooxidation. U.S. Patent Publication No. 2012/0273367, by Themy et al. ("Themy") removes hydrogen sulfide by electrooxidation. Themy is incorporated by reference in its entirety.

By way of providing additional background, context, and to further satisfy the written description requirements of 35 U.S.C. § 112, the following references are incorporated by reference in their entireties: U.S. Pat. No. 4,218,309 issued to Compton, U.S. Pat. Nos. 4,447,330 and 4,536,293 issued to Babineaux, III, Japanese Patent Publication No. 2008055291 issued to Mashahiko et al., Chinese Patent No. 101532380 issued to Zhengguo; U.S. Pat. No. 8,702,853 to Hebblethwaite entitled, "Tank With Containment Chamber and Gas Scrubber"; U.S. Pat. Publ. No. 2016/0010002 to Norling, published Jan. 14, 2016, entitled "Fuel Cleaning System and Method For a Ship"; U.S. Pat. Pub. No. 2015/0217261 to Norling, entitled "Removal of Contaminants from Bunker Oil Fuel," published Aug. 6, 2015; U.S. Pat. No. 3,255,571 entitled "Method and Means for Treating Oil Well Emulsions to Walker, issued Jun. 14, 1966; U.S. Pat. Publ. No. 2015/0122125 to Critchfield, entitled "Method of Improving a Process for the Selective Absorption of Hydrogen Sulfide, published May 7, 2015; U.S. Pat. Publ. No. 2015/0157975 to Critchfield, entitled "Absorbent Composition for the Selective Absorption of Hydrogen Sulfide", published Jun. 11, 2015; U.S. Pat. Publ. No. 2015/0360164 to Carruthers, entitled "Absorbent Having Utility for CO2 Capture from Gas Mixtures" published Dec. 17, 2015; U.S. Pat. No. 9,255,731 to Prim, entitled "Sour NGL Stream Recovery", issued Feb. 9, 2016; U.S. Pat. No. 9,254,453 to McDaniel entitled "Economical Method for Scavenging Hydrogen Sulfide in Fluids," issued Feb. 9, 2016; U.S. Pat. No. 5,135,616 to Nicholson, entitled "Oil Purification", issued Aug. 4, 1992; U.S. Pat. No. 8,845,885 to Hassan entitled "Crude Oil Desulfurization", issued Sep. 30, 2014; U.S. Pat. App. Pub. No. 2014/0353112 to Hassan, entitled "Crude Oil Desulfurization", published Dec. 4, 2014; U.S. Pat. No. 7,523,724 to Duraiswamy, entitled "In Transit Desulfurization of Widely Available Fuels", issued Apr. 28, 2009; U.S. Pat. No. 7,452,405 to Duraiswamy entitled "Multi Stage Sulfur Removal System and Process for an Auxiliary Fuel System", issued Nov. 18, 2008; U.S. Pat. No. 6,539,884 to Husain, entitled "Closed Loop Control of Volatile Organic Compound Emissions from the Tanks of Oil Tankers, Including as May be Simultaneously Safeguarded from Spillage of Oil By an Underpressure System", issued Apr. 1, 2003; U.S. Pat. No. 4,784,746 to Farcasiu et al., entitled "Crude Oil Upgrading Process", issued Nov. 15, 1988; U.S. Pat. No. 4,565,620 to Montgomery et al, entitled "Crude Oil Refining", issued Jan. 21, 1986; U.S. Pat. No. 5,733,516 to DeBerry, entitled "Process for Removal of Hydrogen Sulfide from a Gas Stream," issued Mar. 31, 1998; U.S. Pat. No. 6,881,389 to Paulsen et al., entitled "Removal of $H_2S$ and $CO_2$ from a Hydrocarbon Fluid Stream," issued Apr. 19, 2005; U.S. Pat. No. 7,780,933 to Kikkawa et al., entitled "Method of Removing Sulfur Compounds from Natural Gas," issued Aug. 24, 2010; U.S. Pat. No. 8,187,366 to Yang et al., entitled "Natural Gas Desulfurization," issued May 29, 2012; U.S. Pat. No. 8,465,705 to Ciccarelli et al., entitled "Process for the Reduction/Removal of the Concentration of Hydrogen Sulfide Contained in Natural Gas," issued Jun. 18, 2013; U.S. Pat. App. Pub. No. 2002/0176816 to Smith, entitled "In-Line Sulfur Extraction Process," published Nov. 28, 2002; U.S. Pat. App. Pub. No. 2007/0144943 to Lemaire et al., entitled "Sour Natural Gas Pretreating Method," published Jun. 28, 2007; U.S. Pat. App. Pub. No. 2008/0172942 to O'Rear et al., entitled "Integration of Sulfur Recovery Process with LNG and/or GTL Processes," published Jul. 24, 2008; U.S. Pat. App. Pub. No. 2010/0056404 to Talley, entitled "Method for Treating Hydrogen Sulfide-Containing Fluids," published Mar. 4, 2010; U.S. Pat. App. Pub. No. 2012/0264197 to Mitariten, entitled "$H_2S$ Removal from Contaminated Gases," published Oct. 18, 2012; U.S. Pat. No. 8,664,462 to Milam et al., entitled "Method of Processing Feed Streams Containing Hydrogen Sulfide," issued Mar. 4, 2014; U.S. Pat. No. 9,528,062 to Doong et al., entitled "Removal of Sulfur Compounds in an Acid Gas Stream Generated from Solvent-Based Gas Treating Process," issued Dec. 27, 2016; PCT App. Pub. No. 2000/056441 to Agarwal et al., entitled "System for Recovery of Sulfur and Hydrogen from Sour Gas," published Sep. 28, 2000; PCT App. Pub. No. 1986/002628 to Lynn, entitled "Process for Removal of Hydrogen Sulfide from Gases," published May 9, 1986; and European Pat. App. Pub. No. 0,033,029 to Nicholas et al., entitled "Method of Concentrating and Removing Hydrogen Sulfide from a Contaminated Gas Mixture," published Aug. 5, 1981.

One aspect of the present invention is directed to the use of aeration as an effective removal mechanism because hydrogen sulfide exists as a dissolved gas in some water. Incidentally, the function of aeration is not specifically to oxygenate the water; rather it is to strip the dissolved gas (hydrogen sulfide) out of the water by changing the equilibrium conditions of the water and thus drive the dissolved gas out.

The present invention removes hydrogen sulfide from sour water without the need of a chemical catalyst.

In one embodiment, a method for processing bunker oil is disclosed, the method comprising: filling a first container with water; filling a second container with bunker oil and water, wherein the crude oil comprises hydrogen sulfide; distributing air in a first stream from a device that can create airflow to the first container, using a first connection running from the device to the first container, wherein the terminal end of the first connection comprises at least one opening; collecting air in a vapor space located within the first container, the collected air comprising hydrogen sulfide; transferring the collected air from the vapor space through an enclosed connection to an air compartment; distributing air in a second stream from the device to the air using a second connection running from the device to the air compartment; mixing the second stream and the collected air to form an air mixture; removing the air mixture from the air compartment when the amount of hydrogen sulfide measured is below a desired amount; distributing water from the first container to the second container via a pumping means; measuring the amount of hydrogen sulfide in the bunker oil within the second container; continuing to distribute water from the first container to the second container until the amount of hydrogen sulfide in the bunker oil in the second container is below a desired amount; returning water from the second container to the first container; continuing to distribute air in the second stream from the device to the first container; and continuing to transfer air from the vapor space from the air compartment; and continuing to measure the amount of hydrogen sulfide in the air mixture wherein the air mixture is removed when the amount of hydrogen sulfide measured is below a desired amount.

In another embodiment, a method for removing hydrogen sulfide from an emulsion of water and crude oil is disclosed, the method comprising: receiving, from a well production site, a well production stream comprising sour gas and sour crude oil; separating the well production stream into at least sour gas and an emulsion of sour water and sour oil, wherein the emulsion comprises hydrogen sulfide; treating the emulsion to remove at least a substantial portion of the hydrogen sulfide, the treating comprising: filling a first storage device with water; filling a second storage device with the emulsion; distributing air in a first stream from a device that can create airflow to the first container, using a first connection running from the device to the first container, wherein the terminal end of the first connection comprises at least one opening; collecting air in a vapor space located within the first container, the collected air comprising hydrogen sulfide; transferring the collected air from the vapor space through an enclosed connection to an air compartment; distributing air in a second stream from the device to the air compartment using a second connection running from the device that can create airflow to the air compartment; mixing the second stream and the collected air to form an air mixture; removing the air mixture from the air compartment when the amount of hydrogen sulfide measured is below a desired amount; distributing water from the first container to the second container via a pumping means; measuring the amount of hydrogen sulfide in the crude oil within the second container; continuing to distribute water from the first container to the second container until the amount of hydrogen sulfide in the crude oil in the second container is below a desired amount; returning water from the second container to the first container; continuing to distribute air in the second stream from the device to the first container; continuing to transfer air from the vapor space from the air compartment; and continuing to measure the amount of hydrogen sulfide in the air mixture wherein the air mixture is removed when the amount of hydrogen sulfide measured is below a desired amount. In one embodiment, the crude oil is bunker oil.

In some embodiments, the method further comprises: wherein the water is fresh water; wherein the removed air is released to the atmosphere; wherein when the amount of hydrogen sulfide in the crude (or bunker) oil in the second storage device is below a desired amount, transferring the crude (or bunker oil) out of the second storage device; wherein the (processed) bunker (or crude) oil is transferred to (or transported by or processed within) at least one of a vehicle, a rail car and a ship; maintaining the pH of said water at 7.0 or below; wherein the removed air is stored; wherein the water distributed from the first container to the second container is distributed at an upper portion of the second container; and wherein the incoming stream of sour water (or sour crude oil or bunker oil) is received from a well production site.

In one embodiment, a method for removing hydrogen sulfide from crude oil and water is disclosed, the method comprising: filling a first storage device with water; filling a second storage device with crude oil and water in an equalized amount, wherein the crude oil comprises hydrogen sulfide; distributing air from a device that can create airflow to said first storage device, using a first connection running from said device creating airflow to said first storage device, wherein the terminal end of said first connection comprises at least one opening; transferring air from vapor space located within said first storage device through an enclosed connection to a separate compartment, wherein the separate compartment is capable of mixing air; distributing air from said device that can create airflow to said separate compartment, using a second connection running from said device that can create airflow to said separate air mixing compartment; measuring the amount of hydrogen sulfide in said separate air storage compartment; releasing air from said air storage compartment when the amount of hydrogen sulfide measured is below a desired amount; distributing water from said first storage device to said second storage device via a pumping means, wherein the water from said first storage device enters said second storage device through the top of said second storage device; measuring the amount of hydrogen sulfide in the crude oil within said second storage device; continuing to distribute water from said first storage device to said second storage device until the amount of hydrogen sulfide in the crude oil in said second storage device is below a desired amount; returning water from said second storage device to said first storage device; continuing to distribute air from said device that can create airflow to said first storage device; continuing to transfer air from said vapor space from said first storage device to said separate air mixing compartment; and continuing to measure the amount of hydrogen sulfide in said separate air mixing compartment, wherein air is released from said separate air mixing compartment when the amount of hydrogen sulfide measured is below a desired amount, and wherein said method is devoid of any chemical catalysts or chemical scavengers being employed to remove hydrogen sulfide.

In some embodiments, the method or system further comprises: wherein the first storage device is filled with water comprising hydrogen sulfide, and wherein the water is fresh water.

In another embodiment, a method for removing hydrogen sulfide from crude oil without the use of catalysts or chemical scavengers is disclosed, the method comprising: a) providing a first container adapted to hold crude oil, said first container having an inlet and an outlet; b) providing a desired amount of crude oil into said first container at an atmospheric pressure, said crude oil having a first concentration of hydrogen sulfide; c) contacting the crude oil inside said first container with water entering said first container through said inlet, the water having a first amount of hydrogen sulfide; and d) transferring water out of said first container through said outlet to generate a stream of water, said stream of water having more hydrogen sulfide than said water entering said first container; e) providing a second container adapted to hold water, wherein said second container further comprises a first inlet, a first outlet, and a second outlet; f) filling said second container with water to a level sufficient to provide a vapor space at a top surface of the water through said first inlet with water from said outlet of said first container; g) bubbling air into the water inside said second container; h) transferring hydrogen sulfide from said vapor space through said first outlet in said second container to form a hydrogen sulfide gas containing stream; i) providing air to said hydrogen sulfide gas containing stream to generate a second diluted hydrogen sulfide gas containing stream; and j) transferring water from said second container through said second outlet and into the inlet of said first container; wherein said method is devoid of any chemical catalysts or chemical scavengers being employed to remove hydrogen sulfide.

In some embodiments, the method or system further comprises: wherein after said transferring step, the crude oil in said first container has a reduced concentration of hydrogen sulfide as compared to said first concentration; maintaining the pH of said water at 7.0 or below; performing said method at a temperature of at least 45 degrees Fahrenheit; measuring the amount of hydrogen sulfide present in said crude oil after said contacting step c); where the contacting step c) is performed at a rate from 20 gallons per minute to 8400 gallons per minute; repeating step c) until the amount of hydrogen sulfide in said crude oil is reduced to an amount below 100 parts per million; releasing into the ambient environment the second diluted hydrogen sulfide gas containing stream when the concentration of hydrogen sulfide present in said second diluted hydrogen gas containing stream is below a predetermined level; wherein step j) of transferring is conducted at a rate from 20 gallons per minute to 8400 gallons per minute; wherein step g) of bubbling is conducted at a rate of at least 105 standard cubic feet per minute; wherein contacting said crude oil with water further comprises agitating said crude oil; measuring the concentration of hydrogen sulfide present in the second diluted hydrogen sulfide gas containing stream and releasing into the ambient environment the second diluted hydrogen sulfide gas containing stream when the concentration of hydrogen sulfide is measured below a predetermined level; repeating steps c-j until the concentration of hydrogen sulfide in said crude oil is reduced to 100 parts per million or below; repeating steps h-i until the concentration of hydrogen sulfide present in said second diluted hydrogen sulfide containing stream is below a predetermined level; maintaining the pH of said water at 7.0 or below; performing said method at a temperature of at least 45 degrees Fahrenheit.

In another embodiment, a method for removing hydrogen sulfide from crude oil and water comprises: a) providing a first container adapted to hold water, said first container comprising an aperture, an inlet, and an outlet; b) providing said first container with water sufficient to provide a vapor space between a top surface of the water and said aperture, wherein said water has a pH of 7.0 or below; c) providing a second container, said second container adapted to hold crude oil, and having an inlet and an outlet and having an atmospheric pressure; d) providing said second container with an amount of sour crude oil, wherein said sour crude oil has not been treated by a treatment selected from the group consisting of: hydrotreatment, chemical scavenger treatment, and chemical catalyst treatment; e) bubbling air through the water contained within said first container to produce a first mixed air faction in said vapor space; f) transferring said first mixed air faction from said first vapor space through said aperture to a mixing air station to produce a second mixed air faction; g) providing air to said mixing air station; h) releasing air from said mixing air station when the concentration of hydrogen sulfide present in said second mixed air faction is below a predetermined amount; i) conveying water from said first container to said second container at a rate from 20 gallons per minute to 8400 gallons per minute, whereby said water strips hydrogen sulfide from said crude oil as the water contacts said crude oil, generating a stream of sour water; j) conveying said sour water through said outlet of said second container and into said first container; k) repeating step i) until the amount of hydrogen sulfide in said sour crude oil is reduced to a predetermined level; and l) repeating steps e-h until the concentration of hydrogen sulfide from the water conveyed to said first container is reduced to a predetermined level.

In another embodiment, a method for removing hydrogen sulfide from crude oil and water comprises: filling a first storage device with water; filling a second storage device with crude oil and water in an equalized amount, wherein the crude oil comprises hydrogen sulfide; distributing air from a device that can create airflow to said first storage device, using a first connection running from said device creating airflow to said first storage device, wherein the terminal end of said first connection comprises at least one opening; transferring air from vapor space located within said first storage device through an enclosed connection to a separate compartment, wherein the separate compartment is capable of mixing air; distributing air from said device that can create airflow to said separate compartment, using a second connection running from said device that can create airflow to said separate air mixing compartment; measuring the amount of hydrogen sulfide in said separate air storage compartment; releasing air from said air storage compartment when the amount of hydrogen sulfide measured is below a desired amount; distributing water from said first storage device to said second storage device via a pumping means, wherein the water from said first storage device enters said second storage device through the top of said second storage device; measuring the amount of hydrogen sulfide in the crude oil within said second storage device; continuing to distribute water from said first storage device to said second storage device until the amount of hydrogen sulfide in the crude oil in said second storage device is below a desired amount; returning water from said second storage device to said first storage device; continuing to distribute air from said device that can create airflow to said first storage device; continuing to transfer air from said vapor space from said first storage device to said separate air mixing compartment; and continuing to measure the amount of hydrogen sulfide in said separate air mixing compartment, wherein air is released from said separate air mixing compartment when the amount of hydrogen sulfide measured is below a desired amount.

In certain embodiments, the invention comprises an air source, a tank, a plurality of lines that distribute air from the air source to the tank and a vent stack, connections that distribute the air from the air source into the tank, a hydrogen sulfide monitor, and a vent stack connected to the water tank and air source. The air from the air source runs to a tank filled with sour water through an airflow line. The airflow line is connected to a pipe with at least one hole. The pipe is in the water tank. A second line runs to the vent stack through a second airflow line. In certain embodiments, air flows to the vent stack at a rate of 120 standard cubic feet per minute ("scf/m"). The airflow may be adjusted incrementally every hour for twelve hours. The air distribution ratio may be adjusted hourly until the ratio of airflow to the water tank line increases to about 120 scf/m and the airflow to the vent stack decreases to about 20 scf/m. The amount of hydrogen sulfide is measured near the top of the vent stack. The air with the acceptable levels of hydrogen sulfide is then vented. The plurality of lines running from the air source are secured by typical ways known to those skilled in the art to connect air lines to air source. Embodiments of the present invention ensure that any materials containing hydrogen sulfide are enclosed within the invention and not exposed to the outside environment. As those skilled in the art will recognize, the air source can be any air source able to generate air, such as a compressor or a blower.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principals of this invention.

In certain instances, details that are not necessary for an understanding of the disclosure or that render other details difficult to perceive may have been omitted. Further, the drawings of the system and/or method do not detail all features of the system and/or method, and do not show the entire system and/or method. It should be understood, of course, that the disclosure is not necessarily limited to the particular embodiments illustrated herein.

Figure 1:
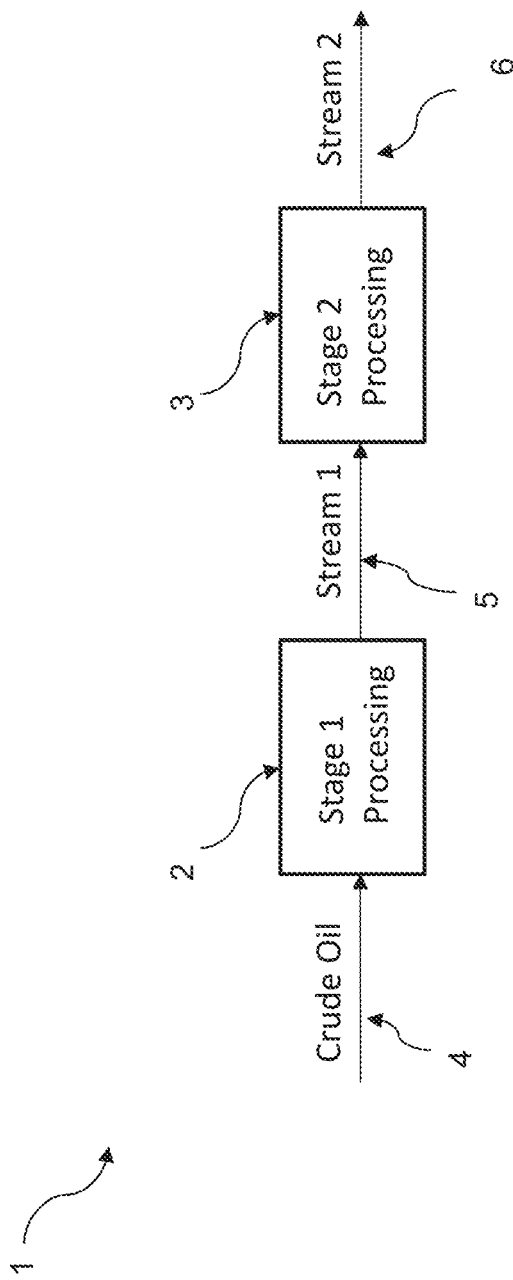
FIG. 1 depicts processing of crude oil, according to one embodiment of the system.

The drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 1 | System |
| 2 | First subsystem |
| 3 | Second subsystem |
| 4 | System input |
| 5 | First stream |
| 6 | Second stream |
| 10 | Sour water container |
| 11 | Air compressor |
| 12 | Cap assembly element |
| 13 | Line |
| 14 | Air dispenser bar |
| 15 | Vapor space air |
| 16 | Vent stack |
| 17 | Air distribution line |
| 18 | Meter gauge |
| 19 | Line |
| 20 | Distribution pump |
| 21 | Line |
| 22 | Attaching line |
| 23 | Sour oil container |
| 24 | Second line |
| 26 | Water pump |
| 27 | Automation cabinet |
| 28 | Air source |
| 29 | Storage rack |
| 30 | Single vessel |
| 31 | Trailer |
| 32 | Partition |
| 34 | Aperture |
| 41 | Pump |
| 42 | Well head |

-continued

| # | Component |
|---|---|
| 43 | Well head line |
| 44 | Site tank farm |
| 45 | Site tank farm line |
| 46 | Offsite tank farm |
| 47 | Offsite tank farm line |
| 50 | Treater/separator |
| 52 | Separated gas line |
| 53 | Converter |
| 54 | Treater/separator line |
| 55 | Pneumatic signal |
| 60 | Gas distribution |
| 62 | Sweetened Oil line |
| 70 | Vehicle |
| 72 | Rail |
| 74 | Ship |
| 76 | Pipeline |
| 80 | Sulfur removal system |
| 1100 | Air compressor or air pump |
| 9025 | Air line |
| 9050 | Water stripping reservoir |
| 9100 | Connection |
| 9150 | High-pressure low-volume pump |
| 9200 | Relief regulator |
| 9250 | Connection |
| 9300 | Pressurized oil sample container |
| 9350 | Element |
| 9400 | Water sample container |
| 9500 | Liquid pressure regulator |
| h | Depth height |

DETAILED DESCRIPTION OF VARIOUS EMBODIMENTS OF THE INVENTION

FIG. 1 depicts processing of crude oil, according to one embodiment of the system. Generally, the system 1 comprises first subsystem 2 and second subsystem 3. First subsystem 2 receives system input 4 (e.g. crude oil) and processes system input 4 as first-stage processing within first subsystem 2. First subsystem 2 outputs first stream 5, which is output to and received by second subsystem 3. Second subsystem 3 outputs second stream 6.

First-stage processing of first subsystem 2 may comprise varying levels of processing, comprising heating as typically performed in oil refineries. Such processing may include heating in, for example, a separator and/or a heater/boiler to separate crude oil components, such as natural gas liquids, naphtha, gasoline, kerosene, light gas oil (diesel), lubricating oil, heavy gas oil and bottoms (e.g. bitumen). In one embodiment, first-stage processing of first subsystem 2 outputs or produces bunker oil as first stream 5. In one embodiment, first-stage processing of first subsystem 2 outputs or produces sour oil as first stream 5. a system and method are disclosed wherein crude oil is processed in a first subsystem, such as a separator and/or heater, to separate oil components. The first subsystem may provide a stream of bunker oil to a second subsystem, wherein hydrogen sulfide is removed from the separated bunker oil.

Figure 2:
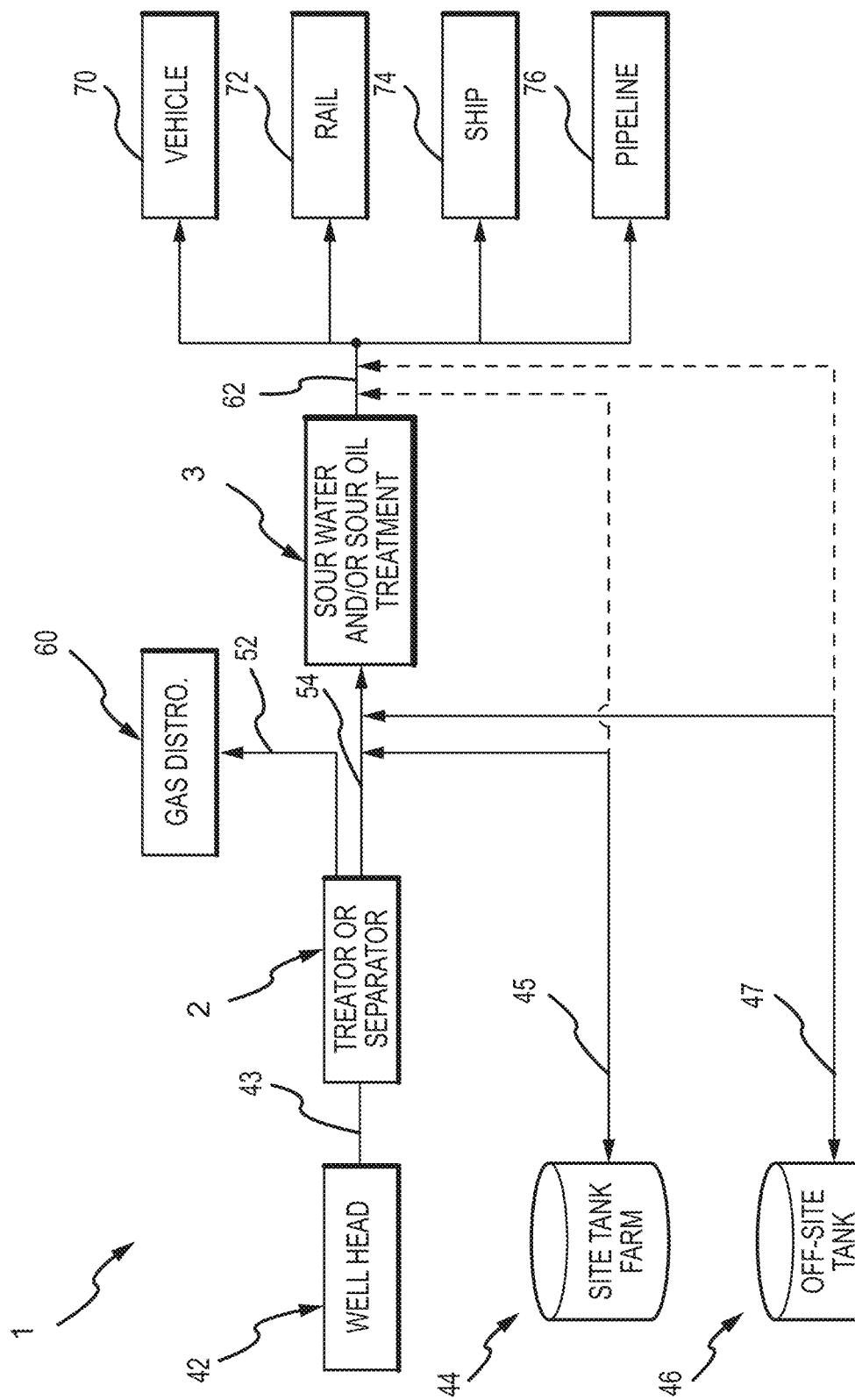
FIG. 2 depicts processing of crude oil, according to another embodiment of the system.

FIG. 2 depicts processing of crude oil, according to another embodiment of the system. More specifically, FIG. 2 depicts certain embodiments of the invention as part of an overall hydrocarbon recovery, processing and transportation system 40. (Here, system 40 is akin to system 1, and separator 50 is akin to first subsystem 2). A well head 42 produces a mixture of hydrocarbon (i.e. sour oil), water and gas, shown as well head line 43. In relation to FIG. 1, the well head 42 produces system input 4. Well head line 43 and enters treater or separator (analogous to "first-stage processing" in first subsystem 2 depicted in FIG. 1) to separate the oil, water, and gas components in any of several known ways. For example, a three-phase separator would separate oil, water and gas, or a 2-phase separator may separate gas from an oil and water emulsion. Such separators are known in the art. In many separators 50, gas separated is sent, via separated gas line 52, for gas distribution 60. Gas distribution 60 may comprise collection, flaring, treating, on-site use for e.g. on-site devices to include vehicles, and storing/selling. Separator 50 outputs treater/separator line 54 comprising sour oil and/or an emulsion of sour oil sour water to second subsystem 3 of the invention (as described above.) treater/separator line 54, and/or sweetened oil line 62, may be joined with other sources of sour oil and/or emulsions of sour oil sour water, comprising site tank farm 44 sources via site tank farm line 45, and off-site tank farm 46 sources via off-site tank farm line 47. (Line 54 may comprise bunker oil, and may comprise bunker oil as treated or processed as described above or elsewhere in this disclosure). Note that line 54 may also return oil and water and/or a water/oil emission to one or both of site tank farm 44 and off-site tank farm 46. Also, note that sweetened oil line 62 may receive and/or output to one or both of site tank farm line 45 and off-site tank farm 46. Finally, one or both of site tank farm line 45 and off-site tank farm 46, if more broadly used for any manner of liquid storage, may also interconnect or communicate with other components of system 40, comprising well head 40, treater/separator 50, subsystem 3, and vehicle 70, rail 72, ship 74 and pipeline 76.

Subsystem 3 outputs sweetened oil at sweetened oil line 62 and delivers the sweetened oil to one or more recipients, comprising vehicles 70 such as semi-tractor trailers e.g. oil trucks, rail cars 72 or railroad receiver systems, nautical ships or nautical receiver systems 74 and pipelines 76.

In certain embodiments, the system 40 comprises "second stage separators" or "gas boots" which serve to allow additional gas to be released from liquids before tankage. For instance, if, for example, element 2, 50 operates at 31 psi, the second stage separator might operate at 16 psi. With some shale production curves falling quickly from 5000 BOPD (bbls oil per day) to 800 BOPD, these intermediate vessels allow the site to operate safely and send less gassy oil to transportation—without the expense of placing a larger treater or multiple treaters, which cost more than the second stage vessels.

In certain embodiments, the system 40 is scaled to be used at a "transload" facility—that is, a pipeline terminal or truck terminal which receives oil of all description and blends it, then loads trains with the oil or sends the oil down other pipelines. One motivation for such blending is to lower the $H_2S$ concentration that would otherwise exist in some batches if not blended with lower $_2S$-concentration oil. $_2S$ concentrations in North Dakota, for instance, are reaching a point where blending might not suffice.

Figure 3:
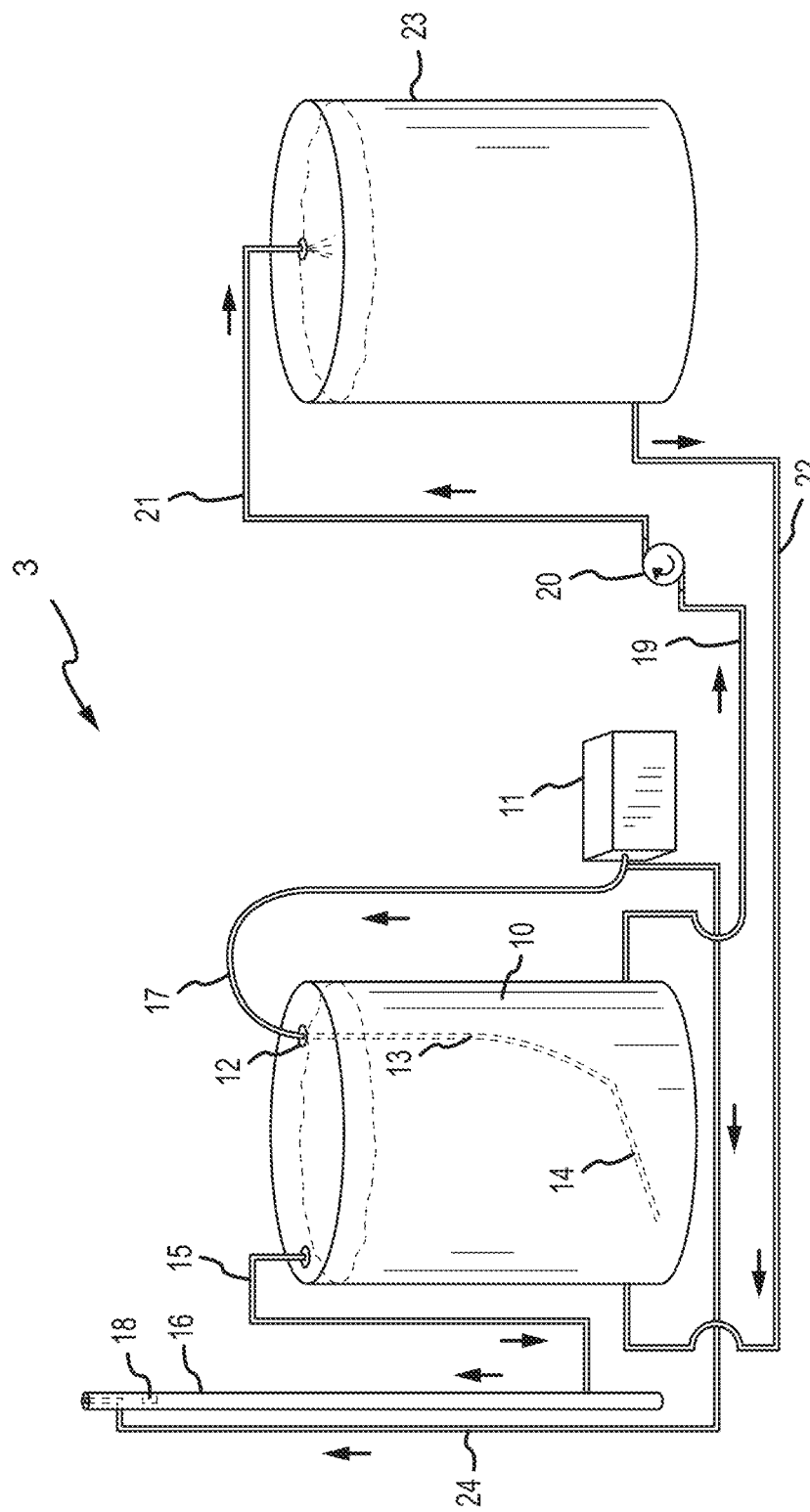
FIG. 3 depicts one embodiment of a subsystem of FIG. 1 or 2 to remove hydrogen sulfide from oil and water.

FIG. 3 provides a diagram depicting certain embodiments of the invention related to a subsystem 3 to remove hydrogen sulfide in water and oil. Element 10 is a container comprising sour water. Element 11 is an air compressor used to distribute air to elements 10 and 16. Element 17 is a line from element 11 to distribute air to element 10, sealed by a cap assembly, element 12. Element 13 is a line running from cap assembly element 12 to an air dispenser bar. Element 14 is an air dispenser bar. Element 14 is submerged in the sour water located in element 10. In alternate embodiments, air dispenser bar 14 is disposed in any location within the container 10, to include the center portion and the upper portion of container 10. The air in the vapor space is transferred by element 15 to a vent stack, element 16. Element 24 is a second line running from element 11 to element 16, where air from the air compressor dilutes air transferred from the vapor space to the vent stack. Element 18 is a gauge that meters the amount of hydrogen sulfide in element 16. The air in the vent stack 16 may be distributed in any of several ways, comprising release to the atmosphere, flaring i.e. burning, and capturing for storage, transport or sale. Also, the vent stack 16 assembly could be modified or substituted to include the further sulfur processing, e.g. a sulfur reduction/removal system (see, e.g., FIG. 7 and associated description.)

Element 23 is a container comprising sour oil and water. The oil and water in element 23 are equalized. Element 19 is a line from element 10 to element 20. Element 20 is a pump that distributes lean water from element 10 to element 23. Element 20 pumps the water through element 21, a line running from element 20 to the top of element 23. In alternate embodiments, line 21 emits water to other than the top of element 23, e.g. from the bottom or side of element 23 (see, e.g. FIG. 7 and associated description.) In alternate embodiments, the oil and water in element 23 are not equalized.

As the water is pumped into element 23, it passes through the sour oil due to a lower specific gravity. As the water travels through the sour oil, it obtains hydrogen sulfide from the oil, thus removing hydrogen sulfide from the oil. The water then returns to element 10 through element 22. Element 22 is a line attaching element 23 to element 10. The water runs from element 23 to element 10 via hydrostatic pressure. In alternate embodiments, the water runs from element 23 to element 10 via other than hydrostatic pressure, e.g. via one or more pumps. Hydrogen sulfide is removed from the water that returns from element 23 as described above. Those skilled in the art can appreciate that the specific elements in the embodiment depicted in this figure are connected using typical connections known to those skilled in the art, such as the appropriate seals, caps, clamps, tubes, O-rings, splitter valves, etc. An important aspect of the present invention is that no specialized equipment is necessary, and the items used are those readily available to those skilled in the art.

In one embodiment, certain embodiments of the invention that are mobile. For example, a commercially-available trailer, to include those conventionally found on hydrocarbon production sites, may transport or domicile components of the system.

In another embodiment, the subsystem 3 of FIG. 3 is configured to remove hydrogen sulfide from water without coupling to a system to remove hydrogen sulfide from oil. Element 10 is a container comprising sour water. Element 11 is an air compressor used to distribute air to element 10. Element 17 is a line from element 11 to distribute air to element 10, sealed by a cap assembly, element 12. Element 12 is secured to elements 11 and 17 using typical items known to those skilled in the art. Element 13 is a line running from cap assembly element 12 to an air dispenser bar, element 14. Elements 12, 13, and 14 are attached using typical means known to those skilled in the art. Element 14 is submerged in the sour water located in element 10. In alternate embodiments, air dispenser bar 14 is disposed in any location within the container 10, to include the center portion and the upper portion of container 10. The air in the vapor space is transferred by element 15 to a vent stack, element 16. Element 24 is a second line running from element 11 runs to element 16, where air from the air compressor dilutes air transferred from the vapor space to the vent stack. Element 18 is a gauge that meters the amount of hydrogen sulfide concentration in element 16. In one alternate embodiment, container or tank or storage vessel 10 is a commercially available tank, to include those of rail cars and truck tanks, and any of standard field tanks, to include both low profile (generally equal or less than 16 feet in height) and high-profile tanks (generally those greater than 16 feet in height). The air in the vent stack 16 may be distributed in any of several ways, comprising release to the atmosphere, flaring i.e. burning, and capturing for storage, transport or sale. Also, the vent stack 16 assembly could be modified or substituted to include the further sulfur processing, e.g. a sulfur reduction/removal system.

The subsystem 3 of FIG. 3 enables re-cycling of production sour water which, when sweetened, may be reused in well production or be deposited on-site for irrigation or other purposes. In one example use, the sweetened water of subsystem 3 may be used as part of a hydraulic-fracturing (i.e. "fracking") operation to remove H2S from fracking blowback water, wherein the treated water may be re-used for fracking or other production uses or disposed of by means which prohibit H2S.

In one embodiment of second subsystem 3, the subsystem 3 is configured to remove hydrogen sulfide from oil without coupling to a system to remove hydrogen sulfide from water. Such a configuration of subsystem 3 would require a supply of water substantially free of H2S (to input as line 21 to a tank 23 of sour oil) and a means to dispose of sour water (as output as line 22) from the tank 23.

Figure 4:
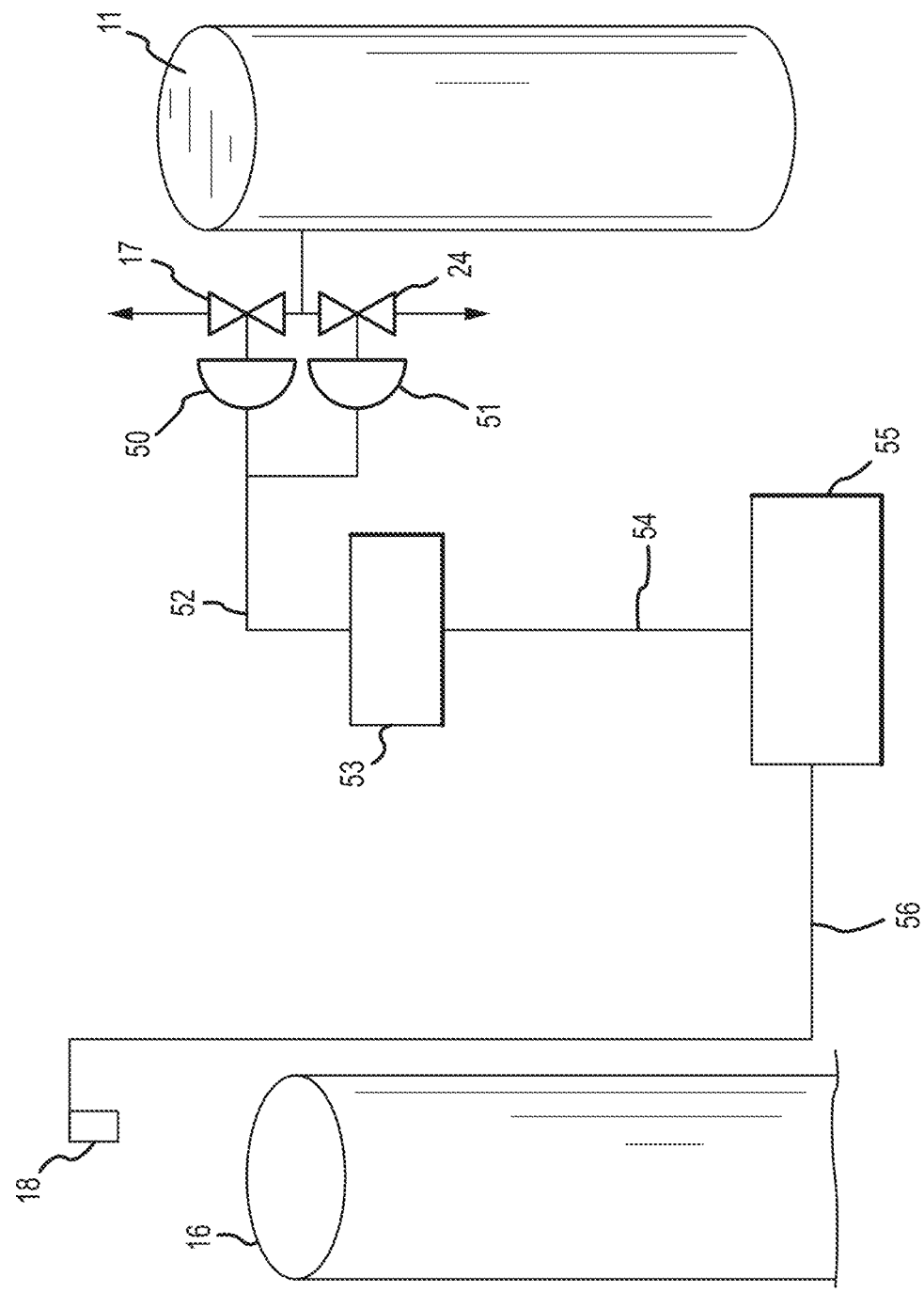
FIG. 4 depicts another embodiment of a subsystem of FIG. 1 or 2 to remove hydrogen sulfide from oil and water.

FIG. 4 depicts another embodiment of a subsystem of FIG. 1 or 2 to remove hydrogen sulfide from oil and water. FIG. 4 provides a diagram depicting certain embodiments of the invention comprising an I to P converter that regulates air flow to a plurality of air lines. Air compressor, element 11 is connected to element 17, a line running air to a tank containing sour water and element 24, a line running air to a vent stack. Element 55 is connected to element 53 by element 54. Element 53 converts an electrical signal from element 55 into a pneumatic signal. The signal from element 53 is relayed by element 52 to elements 50 and 51. Based on the input signal from element 53, element 50 may increase or decrease the amount of air flowing through element 17. Based on the input signal from element 53, element 51 may increase or decrease the amount of air flowing through element 24. Although this diagram depicts a preferred embodiment, other variations to this embodiment, such as using a plurality of I to P converters may be used and is within the spirit of the present invention.

In certain embodiments, the water may enter the sour water container 23 via line element 21 by other than the top of the container, e.g. from the side or bottom of the container. For example, the water entering the tank 23 from line 21 may enter the tank 23 at any vertical location along the tank 23 and at the bottom the tank 23. In some configurations, one or more pumps, such as the pump 20, are employed to deliver water to tank 23.

In certain embodiments, the water provided to tank 23 is by any means so as to provide or maintain a circulation of water at an interface with the sour oil in tank 23. Stated another way, any means of circulating water from the water sweetening tank through to the oil sweetening tank and then back into the water sweetening tank may be implemented. In another embodiment, the water provided to the tank 23 may interface with the sour oil such that the water moves vertically or rolls so as to keep the oil/water interface as fresh as possible. In another embodiment, the water rotates on a horizontal plane. In another example, the tank 23 employs mixers comprising agitators, baffles and similar devices known to those skilled in the art to mix the water and the sour oil.

In one embodiment, in addition to water, oil is circulated through the tank 23. In one embodiment, the only fluid circulated through subsystem 3 is water.

In one embodiment, the size configuration, and quantity of tanks is varied. FIG. 1 depicts an embodiment having one oil sweetening tank 23 and one water sweetening tank 10. Alternatively or additionally, intermediate vessels using internals (e.g. trays, loops and/or baffles) are employed.

In one embodiment, the subsystem 3 employs tanks 10, 23 of any size such that the height of each tank (i.e. each of tanks 10 and 23, and tank 30 of FIG. 5) in the process is equal. In one embodiment, tank 23 is a 1000 bbl tank (for oil sweetening) and tank 10 is a 400 bbl tank (for water sweetening) and vice versa, such that each tank is of the same height, or of heights that allowed the levels required in each tank to be maintained. Tanks 10, 23, 30 may comprise upright cylindrical tanks, horizontal cylindrical tanks, spherical tanks and any manner of rectangular tank(s) and those known to one skilled in the art. In one embodiment, one or more of tanks 10, 23, 30 are commercially available tanks as typically used in the hydrocarbon industry, comprising a 400 bbl, nominally 12'×20', upright cylindrical tank. In one embodiment, tanks 23, 30 are any tanks capable of holding liquid and sealable with standard 4 oz or 8 oz pressure and vacuum hatches. (These are universally called "atmospheric vessels" in that they are made to withstand the hydrostatic weight of liquids and a slight pressure or vacuum at the top, i.e. a vapor space.) In one embodiment, one or more of tanks 10, 23, 30 comprise any tank constructed and rated for more pressure and/or vacuum.

In one embodiment, the subsystem 3 (e.g. of FIG. 3) operates at substantially atmospheric pressure. It has been found that operating subsystem 3 above nominally atmospheric pressure, in some configurations or embodiments, inhibits the transfer of H2S.

In certain embodiments, the subsystem 3 (e.g. of FIG. 3) is a hybrid system in that it includes fluids other than water and crude oil. In one embodiment, the method may use a small amount of liquid surfactant, such as various types of alcohol. Any small amount (1 gallon or less per 300 bbls of water used) of liquid surfactant that is known to "water-wet" microscopic solids is employed. Although the liquid surfactant is not required, the use of a liquid surfactant allows re-use of the same water continuously, nominally indefinitely, without accumulating oil-wet microscopic solids on the oil/water interface in the oil sweetening tank. Such potential solids, if allowed to accumulate at that interface, may inhibit H2S transfer from rich-oil to lean-water. In one embodiment, less than one (1) gallon of household-grade Isopropyl Alcohol (rubbing alcohol) is employed, and/or ethanol and methanol. Commercial products known to "water wet" microscopic solids may additionally or alternatively be used. Such additives are added when needed, as determined by sampling the oil-water interface in the oil sweetening tank with a "tank thief" or any other device capable of obtaining a representative sample of that interface (the sample being equal parts crude oil and water.) Also, simple visual inspection will indicate whether microscopic solids have collected on the interface and thus may motivate a need for such additives. In one embodiment, volumes of approximately between one (1) and two (2) quarts of additive are employed.

In certain embodiments, scavengers may be used, to, for example, minimize processing time of one or both of the processing of sour oil to sweetened oil and sour water to sweet water. In particular, to minimize process slow-down during the approximately last 10-20% of processing duration (where processing duration is time to convert sour oil to a defined level of sweetened oil and/or duration of time to convert sour water to a defined level of sweet water), a scavenger may be used. In such embodiments, a small amount of H2S scavenger liquid is provided to one or both of tank 10 and tank 23. The use of scavengers must be, however, balanced against a possible increase in PH level with some scavengers.

In certain embodiments, chemicals that readily capture $H_2S$, as commercially available, are added to the method to, for example, increase method efficiencies such as reducing processing durations.

In certain embodiments, the method provides a chemical-free sweetening process that treats sour water for reuse in well servicing, production devices and/or for disposal. In certain embodiments, the method removes $H_2S$ without introducing any chemicals into the production (e.g. from the well head) thereby leaving no converted sulfides after treatment. In certain embodiments, the method prevents or retards or mitigates chemical overtreatment or under-treatment in sweetening operations. In certain embodiments, the method removes hydrogen sulfide ($H_2S$) from sour oil, sour water, sour water/sour oil condensate and/or condensate. In certain embodiments, the method takes treated (i.e. sweetened) water and applies the treated water to the production site, e.g. for use in the production well e.g. for fracking. In certain embodiments, the method prevents or reduces or mitigates cross-contamination of wells and/or production site. In certain embodiments, the method may handle high concentrations of $H_2S$ and/or low concentrations of $H_2S$. In certain embodiments, the sweetened water produced is transported to storage tanks and/or placed back online.

In certain embodiments, PH modifiers are employed. In some embodiments, the system and/or method (throughout this disclosure, any reference to the system of the invention also applies to the method and/or process, and vice versa) operates at a PH at or below 7. In some embodiments, the system operates at a PH between 1 and 7. In some embodiments, to modify the water PH downward, various acids or other low-PH materials may be used. Care should be taken to use acidic additives of such low strength per volume that they do not endanger humans or property or the environment in their transportation and use. Acidic additives may comprise low strength hydrochloric acid, vinegar and lemon juice, and any acidic additives known to those skilled in the art.

In certain embodiments, salts may be added. Generally, in some embodiments, water with various heavier salt(s) content is beneficial to the process in that salts provide a cleaner oil/water interface in the oil sweetening tank. In some embodiments, the method may use water comprising fresh water, salt water and any water type wherein the oil being sweetened may float upon it. Generally, in some embodiments, the system employs water from the same formation(s) and wells from which the oil being treated originates; such water has been found in some embodiments to optimize (e.g. increase efficiencies such as reducing processing times) the process.

In certain embodiments, the method operates at ambient temperature. In other embodiments, warmer (than ambient) temperatures are used, which to a threshold limit, sweetens faster, although causes more hydrocarbon vapors to be vented from the oil sweetening tank. Any gaseous component venting from the oil sweetening tank, by definition, lowers the volume of that oil. For this reason, an optimal water temperature range is decided upon weighing shortening of treating times against oil volume loss. In winter in cold climates, water may need to be heated prior to process start to ensure that the water used does not freeze before the process is finished. In one embodiment, anti-freeze chemical components (other than various salts) may be added to the water.

Figure 6:
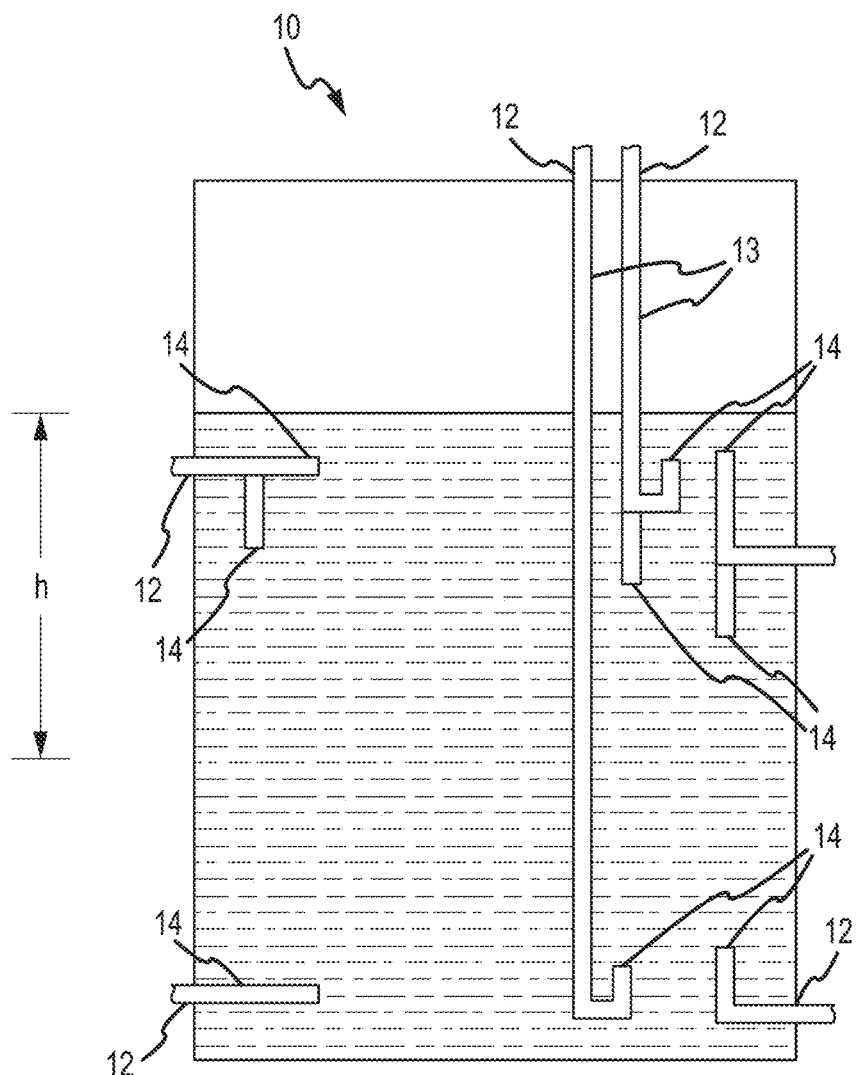
FIG. 6 depicts certain embodiments of air injection of an embodiment of the subsystem of FIG. 1 or 2 to remove hydrogen sulfide from oil and water.

In certain embodiments, the water sweetening tank 10 and the oil sweetening tank 23 (or the levels on each side of partition 32 of single vessel 30 configuration of FIG. 6) are not at the same level, i.e. not sharing a common bottom plane so as to allow use of hydrostatic pressure (aka gravity feed or gravity equalization) to send the now-H2S-rich water from the oil sweetening tank back to the water sweetening tank as depicted in FIG. 1. In such embodiments, additional pumps or similar means are employed to pump or move fluid that otherwise was moved via hydrostatic pressure and automated leveling controls are employed on the tank(s) involved. In such embodiments, tank geometries, such as height and width would not need to be equal.

In certain embodiments, no automation is used, e.g. to control pumping volumes and/or tank relative or absolute heights. In certain embodiments, with proper sizing of pump(s), the entire method could operate manually without any form of automation or controls.

In certain embodiments, tanks 10, 23, 30 comprise any tank or pressure vessel that at minimum may hold atmospheric pressure and/or the associated hydrostatic head (and any dynamic loading of the fluid container within) of the contained fluid. Vessels of higher pressure rating may also be used, as well as rail tank cars and sea-borne containment vessels.

In certain embodiments, no steam is used. In some embodiments, the water used is not heated or provided above 110 degrees Fahrenheit. In some embodiments, the water is initially supplied at higher temperature (e.g. to a maximum of 110 degrees F.) in very cold outside temperatures to provide a nominal minimal temperature (e.g. 60 degrees F.) for the duration of the sweetening process.

Figure 5:
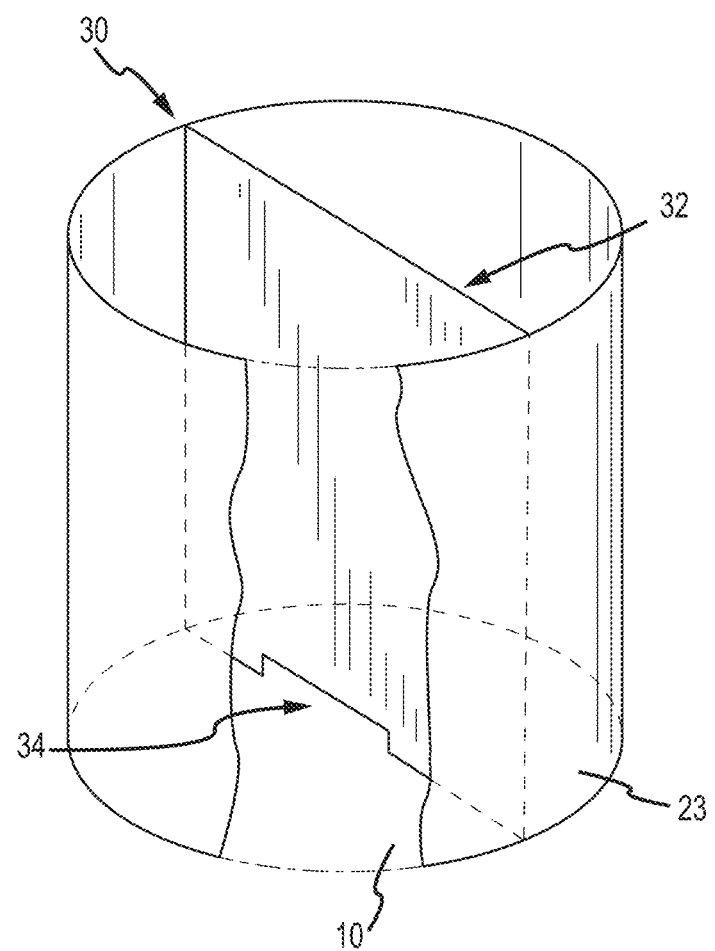
FIG. 5 depicts certain embodiments of the invention that use a common containment vessel.

FIG. 5 depicts certain embodiments of the invention that use a common containment vessel. Single vessel 30 comprises partition 32 and aperture 34. Partition separates sour water tank 10 from sour oil tank 23. Such a single vessel 30 would generally replace separate tanks 10 and 23 of earlier embodiments, e.g. that of FIG. 1, and engage with other components of subsystem 3 (e.g. of FIG. 3) such as line 21 supplying water from tank portion 10 to tank portion 23. Stated another way, all other lines, pumps, compressors or blowers and line entry points into sides of the vessel would be similar or identical to those in the two-tank system (e.g. of FIG. 1), but with added care to be sure no air introduced into the water sweetening side gets into the pump line going to the oil sweetening side. In one configuration, the aperture 34 is a slot at the bottom of the barrier or partition 32, although other configurations are possible, to include circular apertures or any configuration that enables a water rate powered by gravity (weight, hydrostatic pressure) to comfortably exceed that which is pumped into that side of the vessel as H2S-lean water and that prevents air from the water side into the oil side. Note that the line 22 (of FIG. 1), which in above configurations (i.e. those with two physically separate tanks) sends H2S-rich water from the bottom of the oil sweetening tank to the water sweetening tank, would be fully replaced by the opening (aperture 34) in the bottom of the partition 32.

In certain embodiments, the system employs large loops of large diameter pipe instead of tanks.

In certain embodiments, the system employs a non-contained water source such as a lake, ocean, or river, a water well or any source of non-H2S water. In one embodiment, the system disposes of H2S-rich water down a sour water disposal well.

Figure 7:
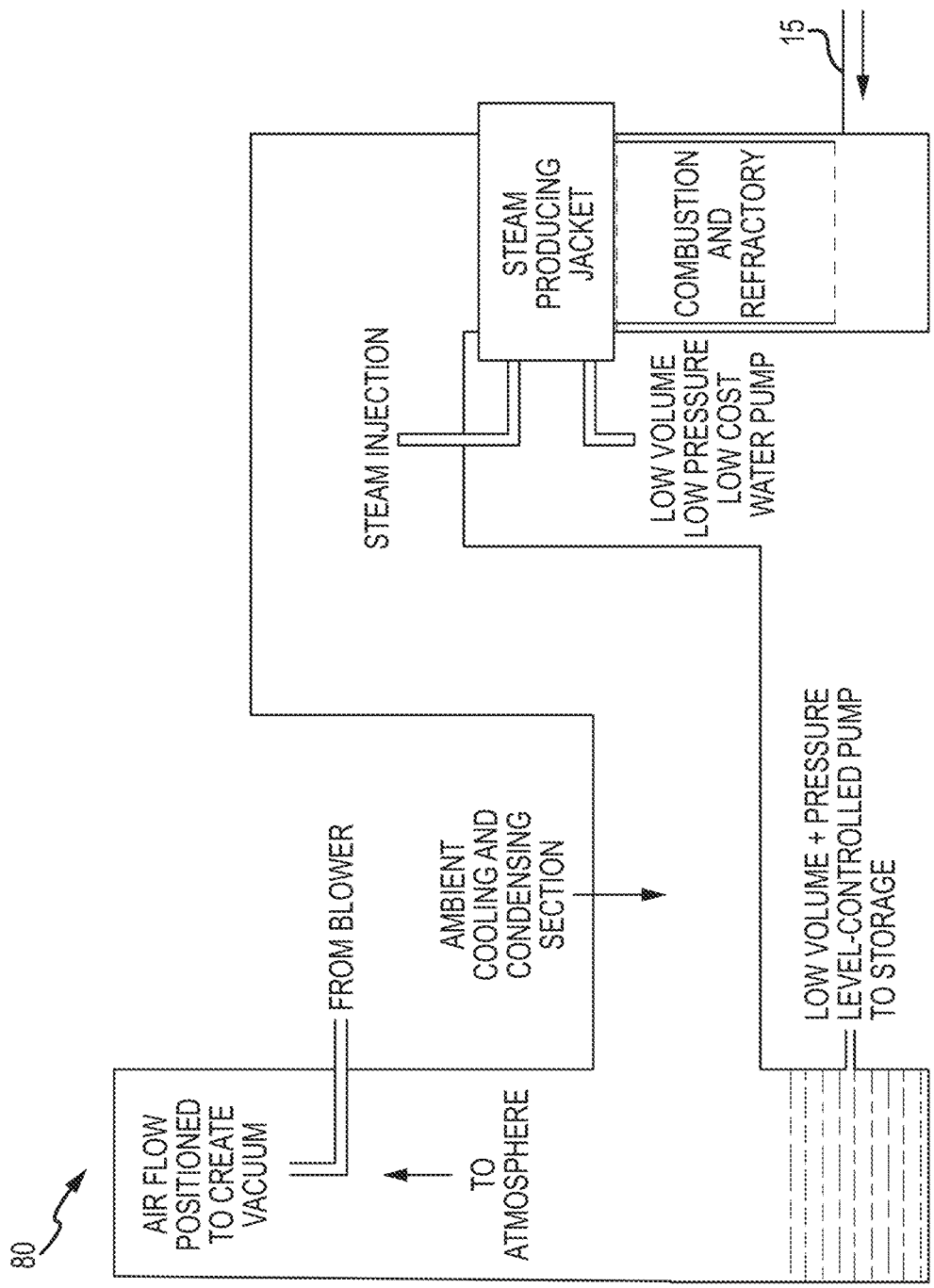
FIG. 7 depicts one embodiment of a system for sulfur reduction or sulfur removal.

FIG. 6 depicts certain embodiments of air injection of an embodiment of the subsystem of FIG. 1 or 2 to remove hydrogen sulfide from oil and water. Specifically, FIG. 6 depicts alternate embodiments of air injection (aka the air line) into sour water tank 10. Generally, one or more pipes or tubes may enter vessel or tank 10, each capped with cap assembly element 12, so as to deliver air via element 14. As such, the air dispenser bar 14 may terminate in a straight pipe run, or an elbow run, as depicted in FIG. 7. The terminus of the air line (i.e. element 14) may be required to be at or below a threshold depth height h from the surface of the water, such as, in a preferred embodiment, at or greater than 0.5 feet, in a more preferred embodiment, at or greater than 1 foot. In some embodiments, the air line enters the tank 10 at any point on the top, bottom or sides of the tank. Note that an air line that enters the tank at the top and then releasing air fairly shallow into the water column allows a lower pressure blower or compressor to be used to provide the air; this is because if that air line comes in at the bottom, even if it terminates and releases air 6 inches beneath the surface, it can fill with water between batches, thereby requiring the compressor or blower to overcome the full hydrostatic weight of the water column in order to start injecting air.

In certain embodiments, the air line may be equipped with flapper-type check valves. In certain embodiments, the air line may terminate inside the tank (the point where the air is injected into the water) open ended, or with a "disperser" consisting of several holes. If there is a disperser, the sum of the area of the holes may equal or exceed the area of the same line (pipe, hose) open ended. If open ended, the line may terminate in a downward direction. If a disperser end is used, that can be oriented in any way convenient—up, down, horizontally. In certain embodiments, the air line from the compressor or blower may be of sufficient size as to not create undue back-pressure on the compressor or blower, as this artificial backpressure wastes energy.

In some embodiments, a compressor or blower with a 10-30 standard cubic feet per minute (SCFM) flow rate will be fitted to a 1.5-inch interior diameter (ID) air line. In some embodiments, a compressor or blower with a 30-65 standard cubic feet per minute (SCFM) flow rate will be fitted to a 2.0-inch interior diameter (ID) air line. In some embodiments, a compressor or blower with a 65-130 standard cubic feet per minute (SCFM) flow rate will be fitted to a 2.5-inch interior diameter (ID) air line. In some embodiments, the sum of the areas of the holes in any disperser arrangement may meet or exceed the areas of these lines. Generally, larger volumes of air flow, as would be used in greatly scaled up versions of the method, will require the air line from the compressor or blower to be sized such that it does not create undue back-pressure on the compressor or blower.

In some embodiments, the air may be injected as far from the water outlet to the pump as possible. In one embodiment, this may be 180 degrees on a circular tank or on the opposite wall on a rectangular tank. If the tank has a longer horizontal dimension, the air injection point and the outlet to the pump may be opposite on or near a line bisecting that longer dimension. Generally, the air should be injected at a point that minimizes the likelihood that injected air may circulate as bubbles to the line going to the pump. In one embodiment, devices or methods are employed to prevent air out of the vapor space above the oil in the oil sweetening tank 23, to include using a cavitation vent.

FIG. 7 depicts another embodiment of a subsystem of FIGS. 1 and 2 for sulfur reduction or sulfur removal system. More specifically, FIG. 7 depicts certain embodiments of a sulfur removal system 80. The process fits or integrates with the above embodiments, e.g. that shown in FIG. 1, by replacing the flare stack. The system 80 receives air from vapor space as element 15. Dilution (line 24) in system 80 would only be used to create a vacuum on the left side of FIG. 7 to reduce backpressure on the system. In that the total stream is cooled significantly by the time it reaches the left side of FIG. 7, a fan placed in the pipe a short way from the end may serve better, thereby reducing the size of the compressor or blower in FIG. 1.

The process of FIG. 7 brings the entire air flow on the exhaust end of the baseline process (the H2S-rich exhaust coming from the water stripping tank) up to a temperature between 900 and 1400 degrees Fahrenheit. This incineration converts all the H2S to SO2 (sulfur dioxide). Waste heat downstream of incineration is then used to create steam (in a steam jacket external of the incineration pipe) from a small amount of fresh water (water new to the system). This steam is injected a short distance downstream of where it is created, into the incineration pipe. The steam quickly grabs the SO2 (although not the H2S, as there is no H2S left at this stage). The air and SO2-rich steam are then cooled to the point that the steam condenses to water. Stated another way, the system makes it rain inside the pipe. (Rain is an apt description here because it is what is commonly known as "acid rain", the SO2 having been converted to sulfuric acid in water.) Note that the acid rain is captured and confined, and not releases into the environment, as occurs when H2S is flared directly. The acidic water is collected. The remaining (now sulfur-free or very sulfur-reduced) air is vented to atmosphere. The acidic water may then be 1) used in the previous process to keep the water PH low, which is essential for efficiency, or 2) treated with a small amount of soda ash (or other inexpensive base) and safely disposed of into common, non-sour water disposal wells.

Figure 8:
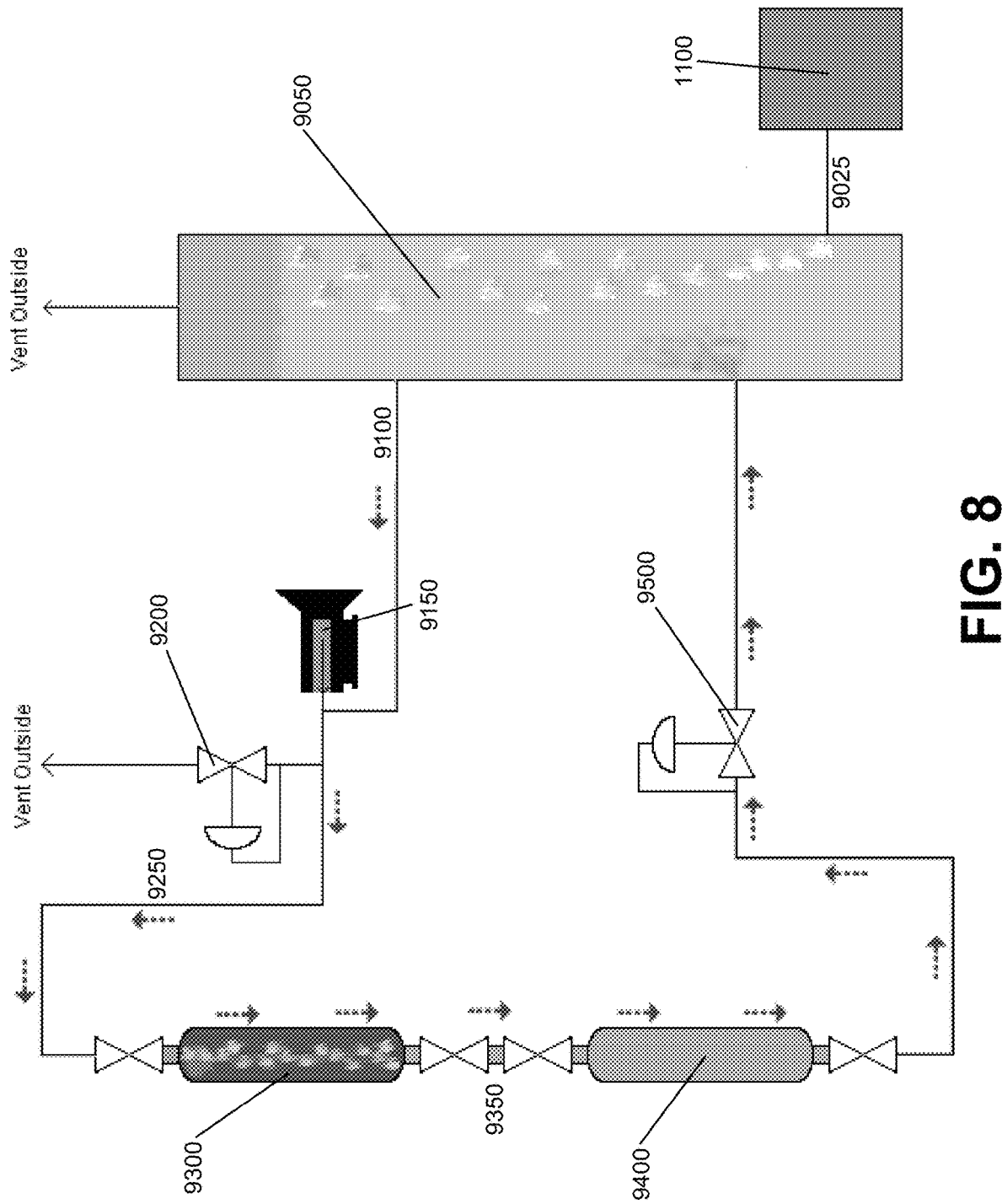
FIG. 8 depicts certain embodiments of the invention comprising a pressurized sample.

FIG. 8 provides a diagram for certain embodiments that comprise a high-pressure low-volume water pump to circulate stripped water through a sample to remove hydrogen sulfide. The embodiment comprises an air compressor or air pump 1100 (e.g. a Coralife SL-381.3 scfm pump), a water stripping reservoir 9050 (e.g. a plastic or metal vessel having a capacity of between about five liters and about ten liters), a high-pressure low-volume pump 9150 (e.g. a pneumatic pump or electric pump such as a Texsteam 5000 series pump), a relief regulator 9200, a pressurized oil sample container 9300 (e.g. a container having a capacity of about one liter and adapted to be pressurized to at least about 75 psi), a water sample container 9400 (e.g. a container having a capacity of about one liter), and optionally a liquid pressure regulator 9500. Upon system initialization or startup, the water stripping reservoir 9050 is mostly but less than completely filled (e.g. filled to between about five eighths of capacity and about three quarters of capacity) with distilled water, then receives water to be stripped from the water sample container 9400 during operation of the system. In operation, the air compressor or air pump 1100 pumps air into the water stripping reservoir 9050 via an air line 9025; a pressure in the water stripping reservoir 9050 may be about atmospheric pressure. The air pumped by the air compressor or air pump 1100 into the water stripping reservoir 9050 bubbles through the water contained in the water stripping reservoir 9050 and strips hydrogen sulfide therefrom; this air can then be vented outside the system, either to the environment or to further processing units downstream. Water from the water stripping reservoir 9050, now having been stripped of hydrogen sulfide, then travels to the high-pressure low-volume pump 9150 via connection 9100. The relief regulator 9200 is connected to the high-pressure low-volume pump 9150 and vents fluid as necessary to maintain a pressure in the high-pressure low-volume pump 9150 at or below a selected setpoint; by way of non-limiting example, the setpoint may be approximately equal to the maximum allowable operating pressure (MAOP) of the pressurized oil sample container 9300 and/or of the water sample container 9400, e.g. about 2000 psi. The water from the high-pressure low-volume pump 9150 then travels to the pressurized oil sample container 9300 via connection 9250; a pressure in the pressurized oil sample container 9300 may be about 75 psi. The water that travels from the high-pressure low-volume pump 9150 into the pressurized oil sample container 9300 via connection 9250 passes through the pressurized oil sample container 9300 and in so doing strips hydrogen sulfide from oil contained in the pressurized oil sample container 9300, then passes to the separate water sample container 9400 via element 9350. The water then passes from the water sample container 9400 back to the water stripping reservoir 9050. A liquid pressure regulator 9500 may be connected to the line connecting the water sample container 9400 to the water stripping reservoir 9050 and may be configured to maintain a pressure in the line at or below a selected setpoint; by way of non-limiting example, the setpoint may be about equal to the pressure in the pressurized oil sample container 9300, e.g. about 75 psi.

In one embodiment, the system 1 and/or first subsystem 2 and/or second subsystem 3 further comprises: the addition of an electric field to increase efficiency and/or effectiveness of hydrogen sulfide and/or sulfur removal, and the addition of the high intensity acoustic waves and resulting cavitation to increase efficiency and/or effectiveness of hydrogen sulfide and/or sulfur removal.

In other embodiments, the system 1 and/or first subsystem 2 and/or second subsystem 3 is performed on-board a sea-borne vessel carrying/shipping sour oil (to include a cruise ship), aboard railcars, within pipelines, in concert with traditional refinery operations (to include $H_2S$ generated from refining processes comprising hydrocracking, hydrolysis, elemental sulfur production).

In one embodiment, the process of FIG. 1 is used wherein bunker oil is first processed as above to remove sulfur, and then the process of FIG. 3 is used to remove hydrogen sulfide from the treated bunker oil. In one embodiment, the input oil to system is refined oil. In one embodiment, the first subsystem 2 first liberates sulfur from bunker oil, and the second subsystem 3 removes hydrogen sulfide. In one embodiment, the removal of hydrogen sulfide is accomplished without aid of special chemicals, such as catalyst chemicals, scavenger chemicals, hydrocarbon sources, and without the use of traditional large-scale facilities. In one embodiment, the removal of hydrogen sulfide is accomplished with the aid of an electric current.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the exemplary claim provided herein.

The invention claimed is:

1. A method for removing hydrogen sulfide from sour water, comprising:
   a) treating a first $H.sub.2S$ water to remove a portion of hydrogen sulfide contained therein by bubbling air up through the first $H.sub.2S$ water, thereby generating an amount of a second $H.sub.2S$ water having less hydrogen sulfide than the first $H.sub.2S$ water;
   b) collecting the air after it has bubbled through the first $H.sub.2S$ water, the collected air comprising hydrogen sulfide;
   c) mixing the collected air with a stream of air to form an air mixture that contains a lower concentration of hydrogen sulfide than the collected air; and
   d) combining the second $H.sub.2S$ water with the first $H.sub.2S$ water,
   e) maintaining the pH of at least one of the first $H.sub.2S$ water and the second $H.sub.2S$ water at no more than about 7.0, and
   f) venting the air mixture to the environment;
   wherein steps a) through d) are repeated until an amount of hydrogen sulfide in the first $H.sub.2S$ water is below a predetermined amount and measuring an amount of hydrogen sulfide in the collected air, and wherein hydrogen sulfide is removed from the sour water without the use of catalyst chemicals or scavenger chemicals, wherein the method is carried out under atmospheric pressure, and wherein a temperature of the sour water is above 45 degrees Fahrenheit.

2. The method of claim 1, further comprising measuring an amount of hydrogen sulfide in the second $H.sub.2S$ water.

3. The method of claim 1, wherein the sour water is treated at an exploratory site.

4. The method of claim 1, wherein the sour water is not heated to a temperature above 110 degrees Fahrenheit.

5. The method of claim 1, wherein the sour water contains hydrogen sulfide in an amount greater than 100 ppm.

6. A method for removing hydrogen sulfide from sour water, comprising:
   a) treating a first $H.sub.2S$ water to remove a portion of hydrogen sulfide contained therein by bubbling air up through the first $H.sub.2S$ water, thereby generating an amount of a second $H.sub.2S$ water having less hydrogen sulfide than the first $H.sub.2S$ water;
   b) collecting the air after it has bubbled through the first $H.sub.2S$ water, the collected air comprising hydrogen sulfide;
   c) measuring an amount of hydrogen sulfide in the collected air;
   d) mixing the collected air with a stream of air to form an air mixture that contains a lower concentration of hydrogen sulfide than the collected air; and
   e) combining the second $H.sub.2S$ water with the first $H.sub.2S$ water,
   f) venting the air mixture to the environment;

g) measuring an amount of hydrogen sulfide in the second H.sub.2S water;

wherein steps a) through e) are repeated until an amount of hydrogen sulfide in the first H.sub.2S water is below a predetermined amount; maintaining the pH of at least one of the first H.sub.2S water and the second H.sub.2S water at no more than about 7.0; and wherein the method is carried out under atmospheric pressure, and wherein hydrogen sulfide is removed from the sour water without the use of catalyst chemicals or scavenger chemicals, wherein the sour water is treated at an exploratory site, and wherein the sour water is not heated to a temperature above 110 degrees Fahrenheit.

7. The method of claim 6, wherein the sour water contains hydrogen sulfide in an amount greater than 100 ppm.

8. The method of claim 6, wherein a temperature of the sour water is above 45 degrees Fahrenheit.

9. A method for removing hydrogen sulfide from sour water, comprising:

a) treating a first H.sub.2S water to remove a portion of hydrogen sulfide contained therein by bubbling air up through the first H.sub.2S water, thereby generating an amount of a second H.sub.2S water having less hydrogen sulfide than the first H.sub.2S water;

b) collecting the air after it has bubbled through the first H.sub.2S water, the collected air comprising hydrogen sulfide;

c) mixing the collected air with a stream of air to form an air mixture that contains a lower concentration of hydrogen sulfide than the collected air; and d) combining the second H.sub.2S water with the first H.sub.2S water, e) venting the air mixture to the environment;

f) measuring an amount of hydrogen sulfide in the second H.sub.2S water, and g) measuring an amount of hydrogen sulfide in the collected air, wherein steps a) through d) are repeated until an amount of hydrogen sulfide in the first H.sub.2S water is below a predetermined amount; wherein hydrogen sulfide is removed from the sour water without the use of catalyst chemicals or scavenger chemicals; wherein a temperature of the sour water is above 45 degrees Fahrenheit, and wherein the sour water is treated at an exploratory site, maintaining the pH of at least one of the first H.sub.2S water and the second H.sub.2S water at no more than about 7.0, wherein the method is carried out under atmospheric pressure, wherein the sour water is not heated to a temperature above 110 degrees Fahrenheit, and wherein the sour water contains hydrogen sulfide in an amount greater than 100 ppm.

* * * * *